United States Patent
Choi et al.

(10) Patent No.: US 11,363,530 B2
(45) Date of Patent: Jun. 14, 2022

(54) SIDELINK POSITIONING BASED ON PHYSICAL RANGING SIGNALS

(71) Applicant: QUALCOMM Incorporated, San Diego, CA (US)

(72) Inventors: Chang-Sik Choi, Hillsborough, NJ (US); Kapil Gulati, Hillsborough, NJ (US); Sudhir Kumar Baghel, Hillsborough, NJ (US); Urs Niesen, Berkeley Heights, NJ (US); Jubin Jose, Basking Ridge, NJ (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/992,939

(22) Filed: Aug. 13, 2020

(65) Prior Publication Data
US 2022/0053422 A1 Feb. 17, 2022

(51) Int. Cl.
| | |
|---|---|
| *H04W 24/00* | (2009.01) |
| *H04W 52/02* | (2009.01) |
| *H04W 48/10* | (2009.01) |
| *H04W 4/02* | (2018.01) |
| *H04W 4/46* | (2018.01) |
| *H04W 56/00* | (2009.01) |

(52) U.S. Cl.
CPC ....... *H04W 52/0229* (2013.01); *H04W 4/023* (2013.01); *H04W 4/027* (2013.01); *H04W 4/46* (2018.02); *H04W 48/10* (2013.01); *H04W 56/001* (2013.01)

(58) Field of Classification Search
CPC ... H04W 52/0229; H04W 4/46; H04W 4/023; H04W 4/027; H04W 48/10; H04W 56/001
See application file for complete search history.

(56) References Cited

U.S. PATENT DOCUMENTS

2018/0220263 A1\* 8/2018 Jiang ..................... H04W 4/023
2019/0208387 A1\* 7/2019 Jiang ................... H04W 72/044
(Continued)

OTHER PUBLICATIONS

International Search Report and Written Opinion—PCT/US2021/034291—ISA/EPO—dated Oct. 22, 2021.

*Primary Examiner* — Erika A Washington
(74) *Attorney, Agent, or Firm* — Paradice and Li LLP

(57) ABSTRACT

A user equipment (UE) in a vehicle (V-UE) broadcasts multi-phased ranging signals with which other entities may determine the range to the V-UE. The multi-phased ranging signals may include a first message, which may be broadcast in the Intelligent Transport System (ITS) spectrum, includes ranging information, such as a source identifier, location information for the broadcasting V-UE, and an expected time of broadcast of the ranging signal. The ranging signal may then be broadcast at the expected time and may include the source identifier. A second message, which be broadcast in the ITS spectrum, may include clock error information for the V-UE. A receiving entity may determine the range to the V-UE based on the time of arrival of the ranging signal and the expected time of transmission, as well as the clock error information. The receiving entity may further generate a position estimate based on the received location information.

34 Claims, 10 Drawing Sheets

900 —

| Broadcast one or more messages with information related to a ranging signal, the information comprising a source identifier identifying the V-UE, location information for the V-UE, clock error information for the V-UE, and a time of broadcast of a ranging signal, the one or more messages broadcast before, or after, or both before and after broadcasting the ranging signal | 902 |

| Broadcast the ranging signal, the ranging signal comprising the source identifier | 904 |

(56) References Cited

U.S. PATENT DOCUMENTS

| | | | |
|---|---|---|---|
| 2019/0221110 A1* | 7/2019 | Vanderveen | H01Q 1/22 |
| 2020/0096949 A1* | 3/2020 | Bhattacharya | G01S 5/021 |
| 2021/0160656 A1* | 5/2021 | Choi | H04W 4/029 |
| 2021/0263166 A1* | 8/2021 | Zheng | H04W 4/023 |

* cited by examiner

SIDELINK POSITIONING BASED ON PHYSICAL RANGING SIGNALS

BACKGROUND

Background Field

The subject matter disclosed herein relates to wireless communications systems, and more particularly to methods and apparatuses for location determination of a user equipment in a wireless communications system.

RELEVANT BACKGROUND

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unreliable or unavailable, e.g., during adverse weather conditions or in areas with poor satellite signal reception such as tunnels or parking complexes. Moreover, position information generated using SPS is prone to imprecision. For example, off-the-shelf GPS positioning devices have an accuracy of a few meters, which is not optimal to ensure safe autonomous driving and navigation.

Coordinated or automated driving requires communications between vehicles, which may be direct or indirect, e.g., via an infrastructure component such as a roadside unit (RSU). For vehicle safety applications, both positioning and ranging are important. For example, vehicle user equipments (UEs) may perform positioning and ranging using sidelink signaling, e.g., broadcasting ranging signals for other vehicle UEs or pedestrian UEs to determine the relative location of the transmitter. An accurate and timely knowledge of the relative locations or ranges to nearby vehicles, enables automated vehicles to safely maneuver and negotiate traffic conditions. Round trip time (RTT), for example, is a technique commonly used for determining a range between transmitters. RTT is a two-way messaging technique in which the time between sending a signal from a first device to receiving an acknowledgement from a second device (minus processing delays) corresponds to the distance (range) between the two devices. While RTT is accurate, it would be desirable to reduce the power consumption required by two way messaging.

SUMMARY

A user equipment (UE) in a vehicle (V-UE) broadcasts multi-phased ranging signals on a sidelink channel with which other entities, including V-UE, UEs held by pedestrian and Road Side Units (RSUs) may determine the range to the V-UE. The multi-phased ranging signals is a sequence of signals. A first message, which may be broadcast in the Intelligent Transport System (ITS) spectrum, includes ranging information, such as a source identifier, location information for the broadcasting V-UE, and an expected time of broadcast of the ranging signal. The ranging signal may then be broadcast at the expected time and may include the source identifier. A second message, which be broadcast in the ITS spectrum, may include clock error information for the V-UE. A receiving entity may determine the range to the V-UE based on the time of arrival of the ranging signal and the expected time of transmission, as well as the clock error information. The receiving entity may further generate a position estimate based on the received location information.

In one implementation, a method of ranging between vehicles performed by a vehicle based user equipment (V-UE), includes broadcasting one or more messages with information related to a ranging signal, the information comprising a source identifier identifying the V-UE, location information for the V-UE, clock error information for the V-UE, and a time of broadcast of a ranging signal, the one or more messages broadcast before, or after, or both before and after broadcasting the ranging signal; and broadcasting the ranging signal, the ranging signal comprising the source identifier.

In one implementation, a vehicle based user equipment (V-UE) configured for ranging between vehicles, includes a wireless transceiver configured to receive broadcast signals from other V-UEs; at least one memory; and at least one processor coupled to the wireless transceiver and the at least one memory, the at least one processor configured to: broadcast one or more messages with information related to a ranging signal, the information comprising a source identifier identifying the V-UE, location information for the V-UE, clock error information for the V-UE, and a time of broadcast of a ranging signal, the one or more messages broadcast before, or after, or both before and after broadcasting the ranging signal; and broadcast the ranging signal, the ranging signal comprising the source identifier.

In one implementation, a vehicle based user equipment (V-UE) configured for ranging between vehicles, includes means for broadcasting a first message with information related to a ranging signal, the information comprising a source identifier identifying the V-UE and location information for the V-UE; means for broadcasting one or more messages with information related to a ranging signal, the information comprising a source identifier identifying the V-UE, location information for the V-UE, clock error information for the V-UE, and a time of broadcast of a ranging signal, the one or more messages broadcast before, or after, or both before and after broadcasting the ranging signal; and means for broadcasting the ranging signal, the ranging signal comprising the source identifier.

In one implementation, a non-transitory storage medium including program code stored thereon, the program code is operable to configure at least one processor in a vehicle based user equipment (V-UE) configured for ranging between vehicles, includes program code to broadcast one or more messages with information related to a ranging signal, the information comprising a source identifier identifying the V-UE, location information for the V-UE, clock error information for the V-UE, and a time of broadcast of a ranging signal, the one or more messages broadcast before, or after, or both before and after broadcasting the ranging signal; and program code to broadcast the ranging signal, the ranging signal comprising the source identifier.

In one implementation, a method of ranging between vehicles performed by a first vehicle based user equipment (V-UE), includes receiving one or more messages broadcast by a second V-UE, the one or more messages comprising information related to a ranging signal to be broadcast by the second V-UE, the information comprising a source identifier identifying the second V-UE, location information for the second V-UE, clock error information for the second V-UE, and a time of broadcast of a ranging signal, the one or more messages is received before, or after, or both before and after receiving the ranging signal; receiving the ranging signal broadcast by the second V-UE, the ranging signal comprising the source identifier; and determining a range to the second V-UE based on the information related to the ranging signal, the ranging signal, and the clock error information received from the second V-UE.

In one implementation, a first vehicle based user equipment (V-UE) configured for ranging between vehicles, includes a wireless transceiver configured to receive broadcast signals from other V-UEs; at least one memory; and at least one processor coupled to the wireless transceiver and the at least one memory, the at least one processor configured to: receive one or more messages broadcast by a second V-UE, the one or more messages comprising information related to a ranging signal to be broadcast by the second V-UE, the information comprising a source identifier identifying the second V-UE, location information for the second V-UE, clock error information for the second V-UE, and a time of broadcast of a ranging signal, the one or more messages is received before, or after, or both before and after receiving the ranging signal; receive the ranging signal broadcast by the second V-UE, the ranging signal comprising the source identifier; and determine a range to the second V-UE based on the information related to the ranging signal, the ranging signal, and the clock error information received from the second V-UE.

In one implementation, a first vehicle based user equipment (V-UE) configured for ranging between vehicles, includes means for receiving one or more messages broadcast by a second V-UE, the one or more messages comprising information related to a ranging signal to be broadcast by the second V-UE, the information comprising a source identifier identifying the second V-UE, location information for the second V-UE, clock error information for the second V-UE, and a time of broadcast of a ranging signal, the one or more messages is received before, or after, or both before and after receiving the ranging signal; means for receiving the ranging signal broadcast by the second V-UE, the ranging signal comprising the source identifier; and means for determining a range to the second V-UE based on the information related to the ranging signal, the ranging signal, and the clock error information received from the second V-UE.

In one implementation, a non-transitory storage medium including program code stored thereon, the program code is operable to configure at least one processor in a first vehicle based user equipment (V-UE) configured for ranging between vehicles, includes program code to receive one or more messages broadcast by a second V-UE, the one or more messages comprising information related to a ranging signal to be broadcast by the second V-UE, the information comprising a source identifier identifying the second V-UE, location information for the second V-UE, clock error information for the second V-UE, and a time of broadcast of a ranging signal, the one or more messages is received before, or after, or both before and after receiving the ranging signal; program code to receive the ranging signal broadcast by the second V-UE, the ranging signal comprising the source identifier; and program code to determine a range to the second V-UE based on the information related to the ranging signal, the ranging signal, and the clock error information received from the second V-UE.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
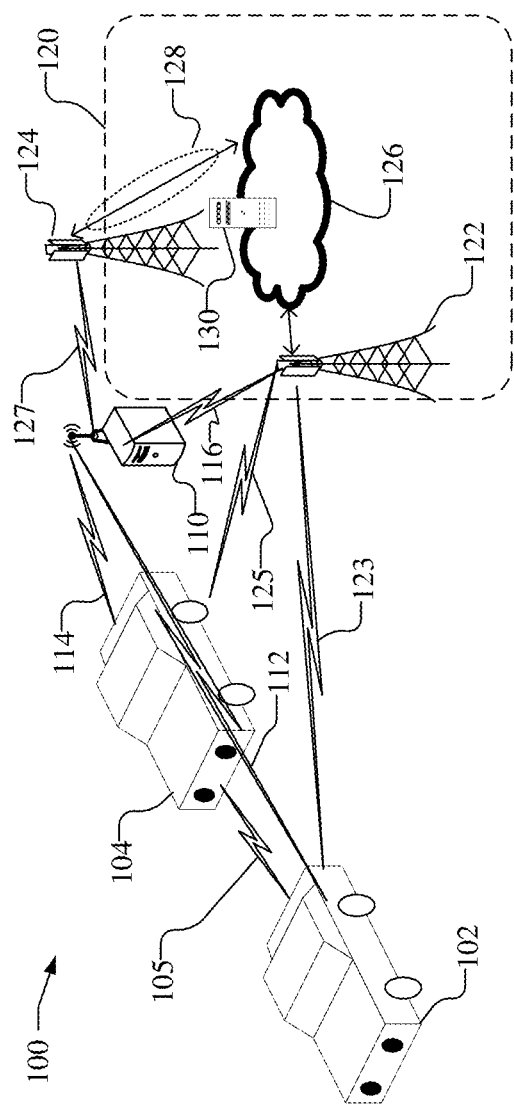
FIG. 1 illustrates a wireless communication system illustrating inter-vehicle communications, including multi-phased ranging signaling to support single sided ranging and positioning.

Inter-vehicle communications may be used, for example, for automated driving and vehicle safety applications. Inter-vehicle communications may be direct, e.g., vehicle to vehicle, or may be indirect, e.g., via an infrastructure component such as a roadside unit (RSU). The inter-vehicle communications may include messaged and information elements (IEs) with which a vehicle may provide information necessary for automated driving For example, for safe operation of autonomous vehicles, the relative locations or ranges to other vehicles needs to be determined. Various approaches may be used to derive the relative positions between vehicles. For example, relative positions of vehicles may be derived using ranging signaling. Ranging signals are sometimes referred to as physical ranging signals, positioning ranging signals, positioning reference signals, or physical referencing signals, and may be collectively referred to herein as PRS signals. PRS signals, for example, may be broadcast by a user equipment (UE) in a vehicle, sometimes referred to as V-UE, and received by other V-UEs and/or infrastructure using direct communication systems, such as dedicated short-range communication (DSRC), cellular Vehicle-to-Everything (C-V2X) communication, and even 5G New Radio (NR) communications. PRS signals, are used to determine a range to the broadcasting vehicle, e.g., using one way ranging, round-trip-time (RTT) positioning operations, or other standard positioning operations such as time of arrival (TOA), time difference of arrival (TDOA) or observed time difference of arrival (OTDOA).

In general, for single-sided ranging, vehicles (or pedestrians) may broadcast PRS in sidelink signaling so that all other nearby vehicles (or pedestrians) may receive the broadcast PRS and determine the range to the broadcasting vehicle. If the broadcasting vehicles have known positions, the position of the receiving vehicle may be determined based on the range to the broadcasting vehicles and their known positions. Thus, ranging and positioning of distributed devices (vehicles or pedestrians) may be enabled using PRS signals over sidelink without infrastructure support.

In some implementations, multi-phased ranging signals may be broadcast by a V-UE on a sidelink channel. The multi-phased ranging signals, for example, is a sequence of broadcast signals, which may include a first message that includes ranging information for the ranging signal to be broadcast. The ranging information, for example, may include a source identifier, location information for the broadcasting V-UE, and an expected time of broadcast of the ranging signal. The ranging signal may then be broadcast at the expected time and may include the source identifier. A second message may be broadcast that include clock error information for the V-UE. A receiving entity may determine the range to the V-UE based on the time of arrival of the ranging signal and the expected time of transmission, as well as the clock error information. The receiving entity may further generate a position estimate based on the received location information and ranges and location information for additional V-UEs.

FIG. 1 illustrates a wireless communication system 100 illustrating inter-vehicle communications, including multi-phased ranging signaling to support single sided ranging and positioning, as described herein. Wireless communication system 100 illustrates a first vehicle 102 with a first wireless device, e.g., V-UE 102, in wireless communications with another V-UE 104, illustrated as a second vehicle. The V-UE 102 and V-UE104 may comprise, but are not limited to, an on board unit (OBU), a vehicle or subsystem thereof, or various other communication devices. The V-UEs 102 and 104 function and provide communications on behalf of their associated vehicles and, accordingly, may be sometimes referred to herein simply as vehicles 102 and 104. The first vehicle 102 and second vehicle 104, for example, may be two vehicles traveling on a road along with other vehicles, not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as ADAS, which helps drivers with critical decisions, such as lane changes, speed changes, overtaking speeds, and may be used to assist in parking as discussed herein. Low latency communications are used in V2X and, are therefore suitable for precise relative positioning, e.g., using ranging signals, such as one way ranging, RTT, TDOA, etc.

In general, there are two modes of operation for V2X services, as defined in Third Generation Partnership Project (3GPP) TS 23.285. One mode of operation uses direct wireless communications between V2X entities when the V2X entities. The other mode of operation uses network based wireless communication between entities. The two modes of operation may be combined, or other modes of operation may be used if desired.

As illustrated in FIG. 1, the wireless communication system 100 may operate using direct or indirect wireless communications between the vehicle 102 and vehicle 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. Thus, as illustrated, vehicle 102 and vehicle 104 may directly communicate using with a Vehicle-to-Vehicle (V2V) communication link 105.

In other implementations, vehicle 102 and vehicle 104 may indirectly communicate, e.g., through a roadside unit (RSU) 110 via Vehicle-to-Infrastructure (V2I) communication links 112 and 114, respectively. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The vehicles 102, 104 and RSU 110 may communicate with additional entities, such as additional vehicles, RSUs or pedestrians (not shown) using direct or indirect communication links. The RSU 110 may be capable of determining relative ranges of vehicles 102 and 104 using PRS broadcast by the vehicles 102 and 104.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., Advanced Driver Assistance System (ADAS) or safety use cases.

Additionally, as illustrated in FIG. 1, the wireless communication system 100 may operate using indirect wireless communications, e.g., using cellular vehicle-to-everything (CV2X). For example, vehicles may communicate via a base station 122 in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access. Thus, as illustrated, the vehicles 102 and 104 may wirelessly communicate with a base station 122 in the network infrastructure 120, via communication links 123 and 125. In some implementations, the base station 122 may directly communicate with the RSU 110 via communication link 116. The base station 122 may also communicate with other base stations 124 through the IP layer 126 and network 128, such as an Evolved Multimedia Broadcast Multicast Services (eM-BMS)/Single Cell Point To Multipoint (SC-PTM) network. A V2X application server 130 may be part of or connected to the IP layer 126 and may receive and route information between the V2X entities as well as receive other external inputs. The base station 124 may wirelessly communicate with the other V2X entities, such as the RSU 110 via communication link 127 or vehicles 102 and 104 via communication links (not shown).

Vehicles 102 and 104 may broadcast PRS on links 105, 112, 114, 123 or 125, with which the range or relative positions between vehicles 102 and 104 may be determined. The PRS broadcast by vehicles 102 and 104 may be any signal suitable for ranging, e.g., as defined for DSRC or C-V2X. The PRS may be broadcast on licensed or unlicensed spectrum. For example, in some implementations, PRS may be broadcast on one or more Unlicensed National Information Infrastructure (UNII) radio bands including, for example, one or more of the UNII-1 radio band, the UNII-2A radio band, the UNII-2B radio band, or the UNII-3 radio band. When broadcast on unlicensed spectrum, listen before transmit (LBT) protocols may be employed.

For example, where vehicles 102 and 104 broadcast PRS in a V2V link 105, the range or relative positions between vehicles 102 and 104 may be determined directly, e.g., using one way ranging. On the other hand, where vehicles 102 and 104 broadcast PRS in V2I links 112 and 114 or via links 123 and 125, the range or relative positions between vehicles 102 and 104 may be determined indirectly based on the range or relative positions between vehicle 102 and RSU 110 (or base station 122) and the range or relative positions between vehicle 104 and RSU 110 (or base station 122), which may be determined using one way ranging.

The V2V communications based on direct wireless communications between the vehicles 102 and 104, do not require any network infrastructure and enable low latency communications, which is advantageous for precise ranging or positioning. Accordingly, such direct wireless V2V communications may be desirable for ranging over short distances, e.g., with nearby vehicles, whereas ranging with vehicles over extended distances have more relaxed latency requirements, and therefore may be able to utilize the vehicle to vehicle signaling via V2V link 105 as well as the vehicle to infrastructure signaling via links 112 and 114 or via links 123 and 125.

Figure 2:
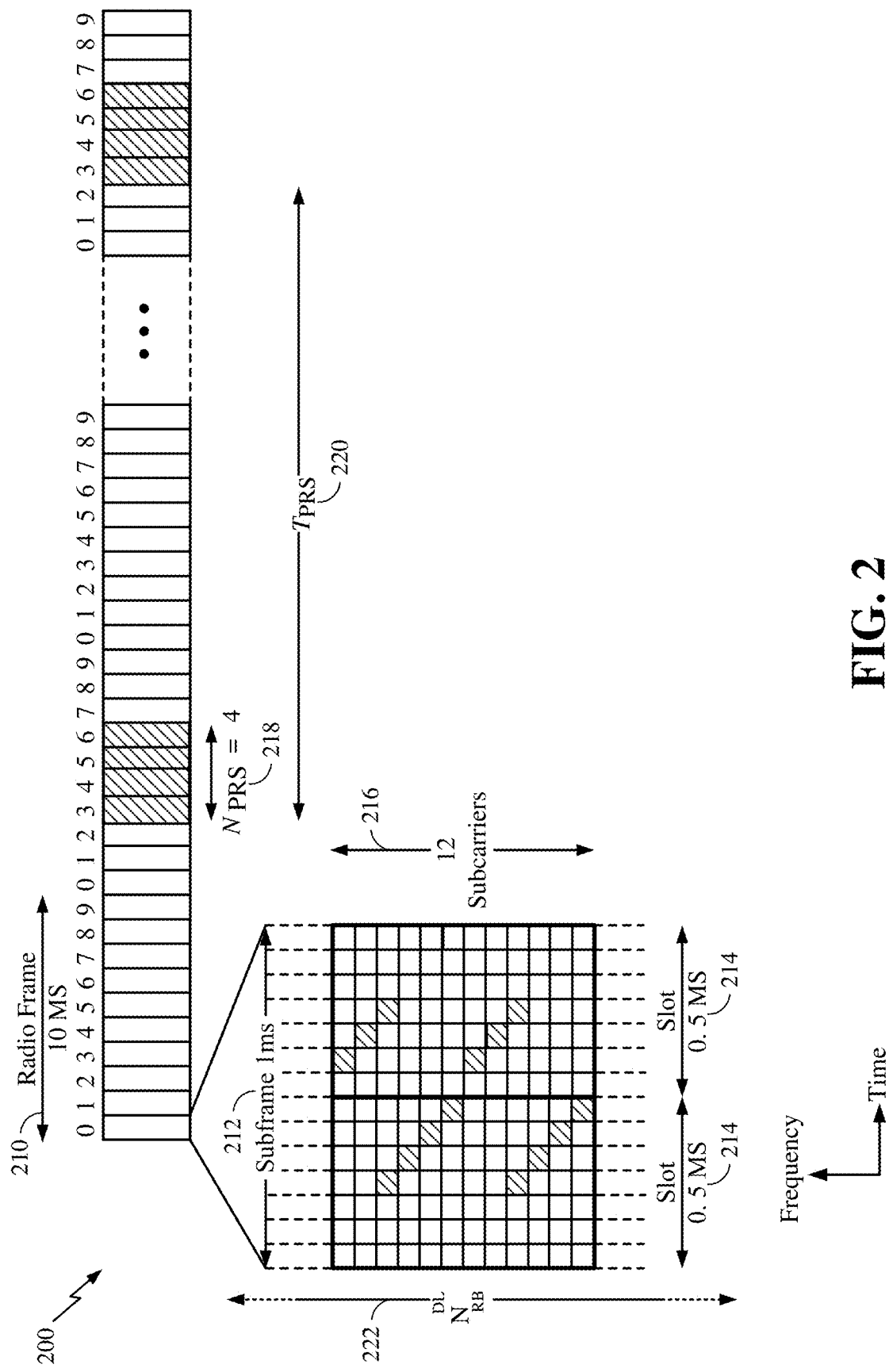
FIG. 2 shows a structure of an example subframe sequence with positioning reference signal (PRS) positioning occasions.

FIG. 2 shows a structure of an example subframe sequence 200 with PRS positioning occasions. Subframe sequence 200 may be applicable to broadcast PRS signals from V-UEs 102 and 104 in wireless communication systems 100. While FIG. 2 provides an example of a subframe sequence for Long Term Evolution (LTE) under The 3rd Generation Partnership Project (3GPP), similar subframe sequence implementations may be realized for other communication technologies/protocols, including V2X.

In FIG. 2, time is represented horizontally (e.g., on an X axis) with time increasing from left to right, while frequency is represented vertically (e.g., on a Y axis) with frequency increasing (or decreasing) from bottom to top. As shown in FIG. 2, downlink and uplink Radio Frames 210 may be of 10 ms duration each. For downlink Frequency Division Duplex (FDD) mode, Radio Frames 210 are organized, in the illustrated embodiments, into ten subframes 212 of 1 ms duration each. Each subframe 212 comprises two slots 214, each of, for example, 0.5 ms duration.

In the frequency domain, the available bandwidth may be divided into uniformly spaced orthogonal subcarriers 216. For example, for a normal length cyclic prefix using, for example, 15 kHz spacing, subcarriers 216 may be grouped into a group of twelve (12) subcarriers. Each grouping, which comprises the 12 subcarriers 216, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$. For example, for a 3 MHz channel bandwidth in the above example, the number of available resource blocks on each channel 222 is given by $N_{RB}^{DL}=15$.

In the wireless communication system 100 illustrated in FIG. 1, a V-UE 102 in sidelink communication with another V-UE 104, may transmit frames, or other physical layer signaling sequences, supporting PRS signals (i.e. a sidelink PRS) according to frame configurations either similar to, or the same as that, shown in FIG. 2 and (as described later) in FIG. 3, which may be measured and used for vehicle ranging. As noted, other types of wireless nodes (e.g., RSU 110) and base stations 122, 124, may also be configured to transmit or receive PRS signals configured in a manner similar to (or the same as) that depicted in FIGS. 2 and 3. Since transmission of a PRS by a wireless node or base station is directed to all V-UEs within radio range, a wireless node or base station can also be considered to transmit (or broadcast) a PRS.

A PRS, which has been defined in Third Generation Partnership Project (3GPP) LTE Release-9 and later releases, may be transmitted by wireless nodes (e.g., base stations) after appropriate configuration (e.g., by an Operations and Maintenance (O&M) server). A PRS may be transmitted in special positioning subframes that are grouped into positioning occasions. PRS occasions may be grouped into one or more PRS occasion groups. For example, in LTE, a PRS positioning occasion can comprise a number $N_{PRS}$ of consecutive positioning subframes where the number $N_{PRS}$ may be between 1 and 160 (e.g., may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 2 illustrates a periodicity of positioning occasions where $N_{PRS}$ equals 4218 and $T_{PRS}$ is greater than or equal to 20220. In some aspects, $T_{PRS}$ may be measured in terms of the number of subframes between the start of consecutive positioning occasions.

Figure 3:
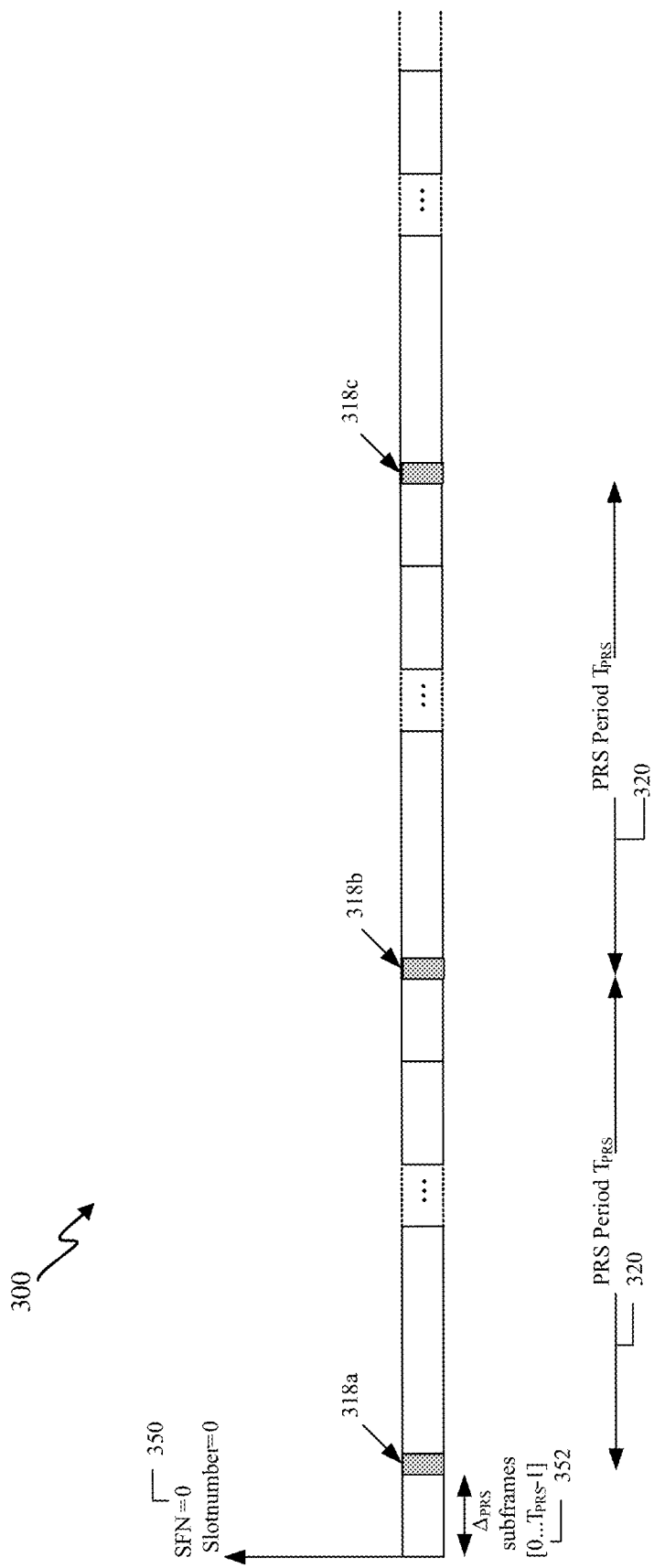
FIG. 3 illustrates an exemplary PRS configuration for a cell supported by a wireless node.

FIG. 3 illustrates an exemplary PRS configuration 300 for a cell supported by a wireless node (such as a base station). Again, PRS transmission for LTE is assumed in FIG. 3, although the same or similar aspects of PRS transmission to those shown in and described for FIG. 3 may apply to sidelink transmission between V-UEs 102, 104 in V2X, and/or other wireless technologies. FIG. 3 shows how PRS positioning occasions are determined by a System Frame Number (SFN), a cell specific subframe offset ($\Delta_{PRS}$) 352, and the PRS Periodicity ($T_{PRS}$) 320. Typically, the cell specific PRS subframe configuration is defined by a "PRS Configuration Index"/PRS included in the OTDOA assistance data. The PRS Periodicity ($T_{PRS}$) 320 and the cell specific subframe offset ($\Delta_{PRS}$) are defined based on the PRS Configuration Index $I_{PRS}$, in 3GPP TS 36.211 entitled "Physical channels and modulation." A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 320, and APRs is the cell-specific subframe offset 352.

As shown in FIG. 3, the cell specific subframe offset $\Delta_{PRS}$ 352 may be defined in terms of the number of subframes transmitted starting from System Frame Number 0 (Slot 'Number 0', marked as slot 350) to the start of the first (subsequent) PRS positioning occasion. In the example in FIG. 3, the number of consecutive positioning subframes ($N_{PRS}$) in each of the consecutive PRS positioning occasions 318a, 318b, and 318c equals 4.

Typically, PRS occasions from all cells in a network that use the same frequency are aligned in time and may have a fixed known time offset (e.g., cell-specific subframe offset 352) relative to other cells in the network that use a different frequency. In SFN-synchronous networks all wireless nodes (e.g., base stations) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}$=1, $T_{PRS}$=160 subframes (equivalent to 160 ms), and BW=1.4, 3, 5, 10, 15, or 20 MHz. To increase the PRS duty cycle, the $N_{PRS}$ value can be increased to six (i.e., $N_{PRS}$=6) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}$=$T_{PRS}$), may also be used in later versions of LPP according to 3GPP TS 36.355. A directional PRS may be configured as just described according to 3GPP TSs and may, for example, use a low PRS duty cycle (e.g., $N_{PRS}$=1, $T_{PRS}$=160 subframes) or a high duty cycle.

As noted above, the subframe sequence 200 with PRS positioning occasions and PRS configuration 300 shown in FIGS. 2 and 3 are specific for LTE. Nevertheless, similar subframe sequence and PRS configurations may be used for V2X, e.g., with appropriate changes. For example, in some implementations, for V2X, PRS candidate slots may be every 100 msec and may spans 100 RB over a 20 MHz bandwidth.

The relative locations between vehicles may be determined as a range between vehicles based on PRS. For example, a V-UE 102 may broadcast PRS, and may further transmit the time of transmission of the PRS, e.g., in an ITS message, as described herein. The receiving V-UE 104 receives the PRS and uses the time of reception, as measured at V-UE 104 along with the time of transmission as provided by the V-UE 102 to determine the time of flight of the PRS. The V-UE 104 may determine the distance or range between the vehicles based on the time of flight and the speed of light.

Figure 4:
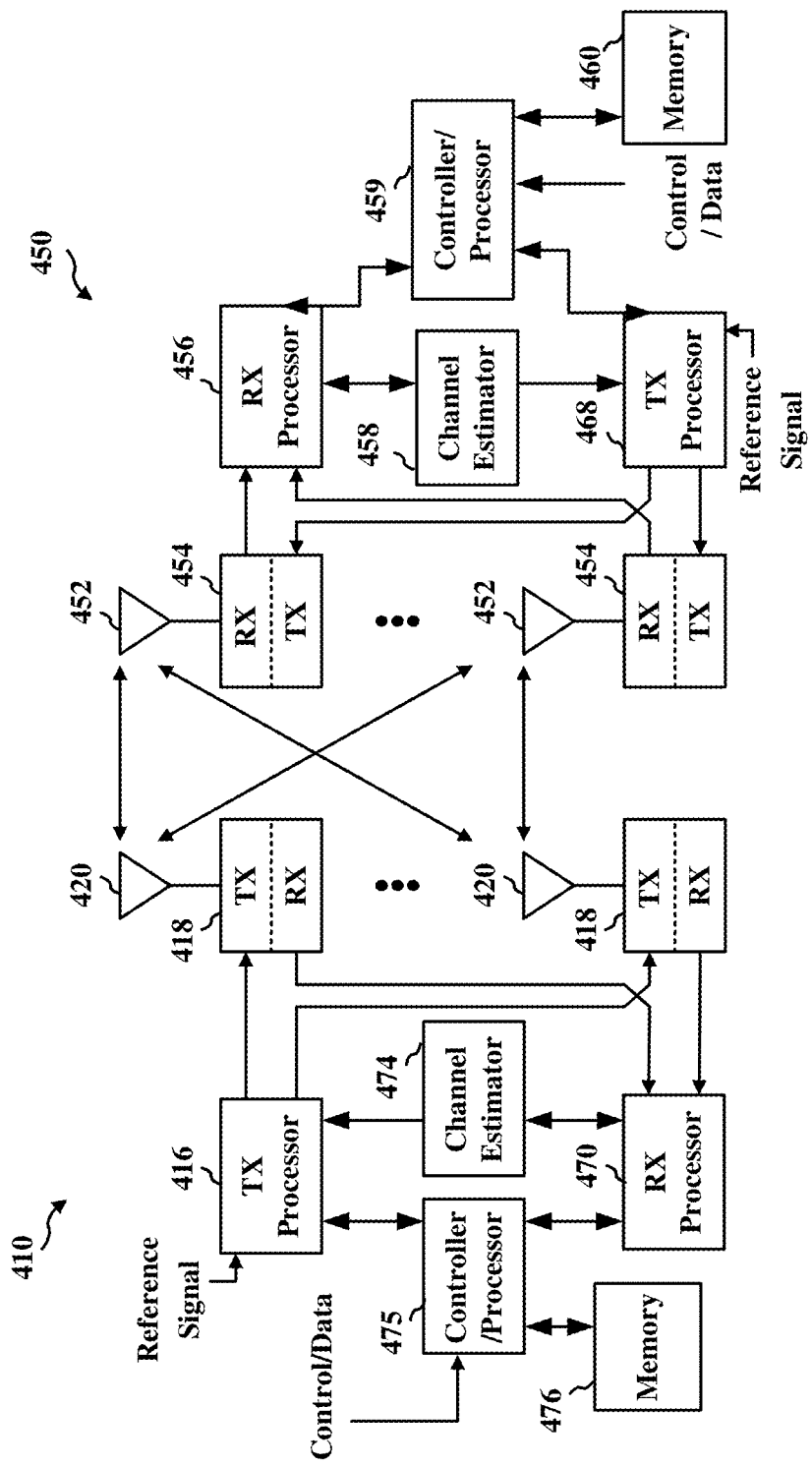
FIG. 4 is a block diagram of a base station in communication with a UE in an access network.

FIG. 4 is a block diagram of a base station 410 in communication with a UE 450 in an access network. The UE 450, for example, may be a wireless device such as V-UE 102, illustrated in FIG. 1. The base station 410, for example, may be the RSU 110, or one of base stations 122, 124, or may be another wireless device, such as V-UE 104, illustrated in FIG. 1, using sidelink communications. In the DL from base station 410, IP packets may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (such as master information block (MIB), and system information block (SIBs)), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression and decompression, security (such as ciphering, deciphering, integrity protection, integrity verification), and handover support functions; RLC layer functionality associated with the transfer of upper layer packet data units (PDUs), error correction through Automatic Repeat Request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through Hybrid Automatic Repeat Request (HARQ), priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and multiple-input/multiple-output (MIMO) antenna processing. The TX processor 416 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets. The controller/processor 459 is also responsible for error detection using an acknowledgement (ACK) or negative acknowledgement (NACK) protocol to support HARQ operations.

Similar to the functionality described in connection with the DL transmission by the base station 410, the controller/processor 459 provides RRC layer functionality associated with system information acquisition, RRC connections, and measurement reporting; PDCP layer functionality associated with header compression and decompression, and security (such as ciphering, deciphering, integrity protection, and integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to a server, such as V2X application server 130. The controller/processor 475 is also responsible for error detection using an ACK-NACK protocol to support HARQ operations.

Timing information, real-time traffic information, collision avoidance information, and some other features provided by V2X communications and V2X channels of a RAN may depend, at least in part, on the ability of a V-UE to accurately determine its position relative to other vehicles or obstacles and to accurately determine distances between the V-UE and nearby vehicles or obstacles, i.e., ranging. In accordance with some aspects of the present disclosure, ranging signals (e.g., PRS signals) may be transmitted to nearby entities, e.g., other V-UEs, RSUs, pedestrians, etc. The PRS may be transmitted single-sided, i.e., without use of acknowledgement messages. The receiving V-UE may measure the time of arrival (TOA) of a single-sided ranging signal, but the transmission time of the ranging signals will be unknown. Accordingly, in addition to broadcasting the ranging (PRS) signals, the V-UE needs to broadcast additional information with which the receiving V-UE may use to determine the determine the range to the broadcasting V-UE. The transmitting V-UE may broadcast additional information as well with which the receiving V-UE, for example, may increase accuracy of the ranging measurement or determine position.

In one implementation, ranging may be performed using multi-phased signaling by a transmitting V-UE via sidelink signaling. For example, one or more phases, message(s) may be broadcast that include information about the ranging signal, and in another phase, the ranging signal may be broadcast. For example, in a first phase, the transmitting V-UE may broadcast a message that includes information related to an upcoming ranging signal. For example, the first message may be broadcast in the ITS spectrum. The second phase may be the broadcast of the a physical ranging signal, such as a PRS signal. The third phase may be the broadcast of another message that includes information related to the previously transmitted ranging signal. For example, this second message may be broadcast in the ITS spectrum. Information may be transmitted interchangeably between the first and third phase or the first and third phase may be combined. The multi-phase signaling is a single ranging procedure, with which a receiving V-UE may determine the range to the transmitting V-UE. The single ranging procedure may be repeated multiple times.

In the first stage, for example, a transmitting V-UE 102 may prepare a first message that includes information related to an ranging signal and sends the first message, via broadcast. The first message, for example, may include ranging information, such as a device-specific source identifier (ID), e.g., identifying the V-UE 102, location information for the V-UE 102, and the time of the broadcast of the ranging signal may be included, e.g., if the ranging signal is broadcast on a licensed spectrum. The expected time of broadcast, for example, may be based on a universal time acquired via the IP layer 126 and network 128. In some implementations, the location information of the V-UE 102 may include a current location of the V-UE 102 and the velocity of the V-UE 102 (e.g., the absolute speed and direction). In some implementations, the location information may include the expected location of the V-UE 102 at the expected time of broadcast of the ranging signal, which may be determined based on the current location and velocity and the time until the broadcast of the ranging signal. The first message may be transmitted, e.g., in the ITS spectrum, to nearby receivers such as V-UE 104 or UEs used by pedestrians, or RSU 110, via broadcast.

In the second stage, the transmitting V-UE 102 broadcasts the ranging signal, e.g., the PRS signal, at the expected time, as indicated in the first message. The ranging signal may contain the device-specific source ID that was provided in the first message so that the receiving device may associate the broadcast ranging signal with the previously broadcast first message. The ranging signal may also contains sequence ID that identifies the ranging signal with respect to other ranging signals broadcast by V-UE 102 or with respect to other ranging signals broadcast by other transmitters. In some implementations, the source ID and the sequence ID may be the same ID. In one embodiment, the PRS waveform may be based on one or more of the source ID and the sequence ID, or a combination thereof, so that V-UE 104 that receives the PRS waveform may deduce the PRS source and sequence from the signaling itself. For example, the PRS waveforms may be included in a set, and depending on the source ID (and/or sequence ID), the transmitting V-UE 102 may select one of the PRS waveforms from the set. The selected PRS waveform may thus, provide an indication of the source ID and sequence ID for the V-UE 102.

In the third stage, the transmitting V-UE 102 prepares a second message that includes information related to the previously broadcast ranging signal and sends the second message, via broadcast. The second message, for example, may include information such as the clock error information of the transmitting V-UE 102, as well as the source ID and the time the ranging signal was broadcast, e.g., if the ranging signal was broadcast on an unlicensed spectrum. In some implementations, the V-UE 102 may indirectly determine the clock error between broadcasting the first message and broadcasting the ranging signal, e.g., using received ranging signals from other nearby transmitters. The second message may also include the variance of the clock error of the V-UE 102, which may also be determined indirectly using received ranging signals from other nearby transmitters. In some implementations, the third phase may be skipped, for example, if the clock error is unavailable to the V-UE 102 or such procedure is unnecessary for the receiving V-UE 104. In other implementations, the first phase may be combined with the third phase, e.g., and may be sent either before or after broadcast of the ranging signals.

The receiving device may determine the range to the transmitting device based on the difference between the time of arrival of the ranging signal at the receiving device and the time of broadcast from the transmitting device, e.g., as provided in the first message. The difference between the time of arrival and the time of transmission is the time of flight of the ranging signal. The time of flight may be divided by the speed of the ranging signal, i.e., the speed of light, to determine the distance between the receiving device and the transmitting device. Because the transmitting device and receiving device are not synchronized, however, a clock error may affect the accuracy of the measurement. Clock error, for example, is intrinsic to each device. The clock error, for example, may be due to clock drift and clock bias, and may generally be written as:

$$\text{clock\_error} = \text{bias} + \text{drift} * \text{time}. \quad \text{Eq. 1}$$

The clock bias, may be due to various aspects of the system, such as Tx/Rx calibration error, oscillator bias, synchronization error, etc. The clock drift is due to the divergence of the clocks at the different V-UEs. A clock error may be determined by each device, but the clock error in a single V-UE is not useful since the total ranging error contributed by clock error is from two sources, i.e., the clock error in the time of departure (TOD) from the V-UE 102 and the clock error in the time of arrival (TOA) at the V-UE 104. By way of example, the measured range between the transmitting V-UE 102 and the receiving V-UE 104 as measured at the receiving V-UE 104 will include a clock error, and may be written as:

$$\text{Range} = \frac{1}{c}\|TOD - TOA\| + \text{clock\_error}. \quad \text{Eq. 2}$$

The measured range differs from the true range by the clock error. The clock error includes components from both the transmitting V-UE 102 measured and the receiving device V-UE 104, i.e., both devices include clock errors due to clock bias and drift. Accordingly, for a more accurate range measurement, the clock error may be determined by the transmitting device V-UE 102 and transmitted to the receiving device V-UE 104. The clock error information from the transmitting device V-UE 102 may be used by the receiving device V-UE 104 (e.g., along with clock error information for the receiving device V-UE 104) to improve the accuracy of the range measurement, e.g., by removing the clock error component due to the transmitting device V-UE 102, the receiving device V-UE 104, or both. For example, the receiving device V-UE 104 may adjust the time of departure TOD as received from the transmitting V-UE 104 based on the clock error information received from the transmitting device V-UE 104. The receiving device V-UE 104 may further adjust the time of arrival (TOA) as measured at the receiving device V-UE 104 based on the determined clock error for the receiving device V-UE 104.

The multi-phase signaling procedure may be repeated multiple times. For each multi-phase signaling, at each different time instance, a new message is broadcast for each phase, e.g., a new first message with the source ID, the location information for the V-UE 102, the velocity of the V-UE 102, and the expected time of broadcast of the ranging signal, a new ranging signal, with the source ID and optionally a sequence ID, and a new second message with the current clock error information. The sequence ID may be generated at the group phase. For example, the UEs are grouped together every 1000 msec. In this group phase, the sequence ID may be defined and used within that period. To accurately derive the location of a receiving V-UE 104, the V-UE 104 may receive multi-phased signaling from multiple transmitters and may determine the range to each transmitter, which along with the positions of each transmitter (e.g., provided in the first message from each transmitter), may be used to determine the position of the receiving V-UE 104, e.g. using trilateration. In some implementations, knowledge of the location of the road and local geography, which may be obtained through the IP layer 126 and network 128, shown in FIG. 1, may be used to assist in positioning of the V-UE 104.

The use of multi-phased ranging signaling, thus, provides a way to derive the range and location of vehicles or pedestrians without relying on existing infrastructure. The various messages sent before and/or after the broadcast of the ranging signal provides the information with which nearby receivers may derive their range to the transmitter and their locations using sidelink communications, which may be broadcast in unlicensed or licensed spectrums, and does not require acknowledgement or return messages, thereby reducing overhead.

Figure 5:
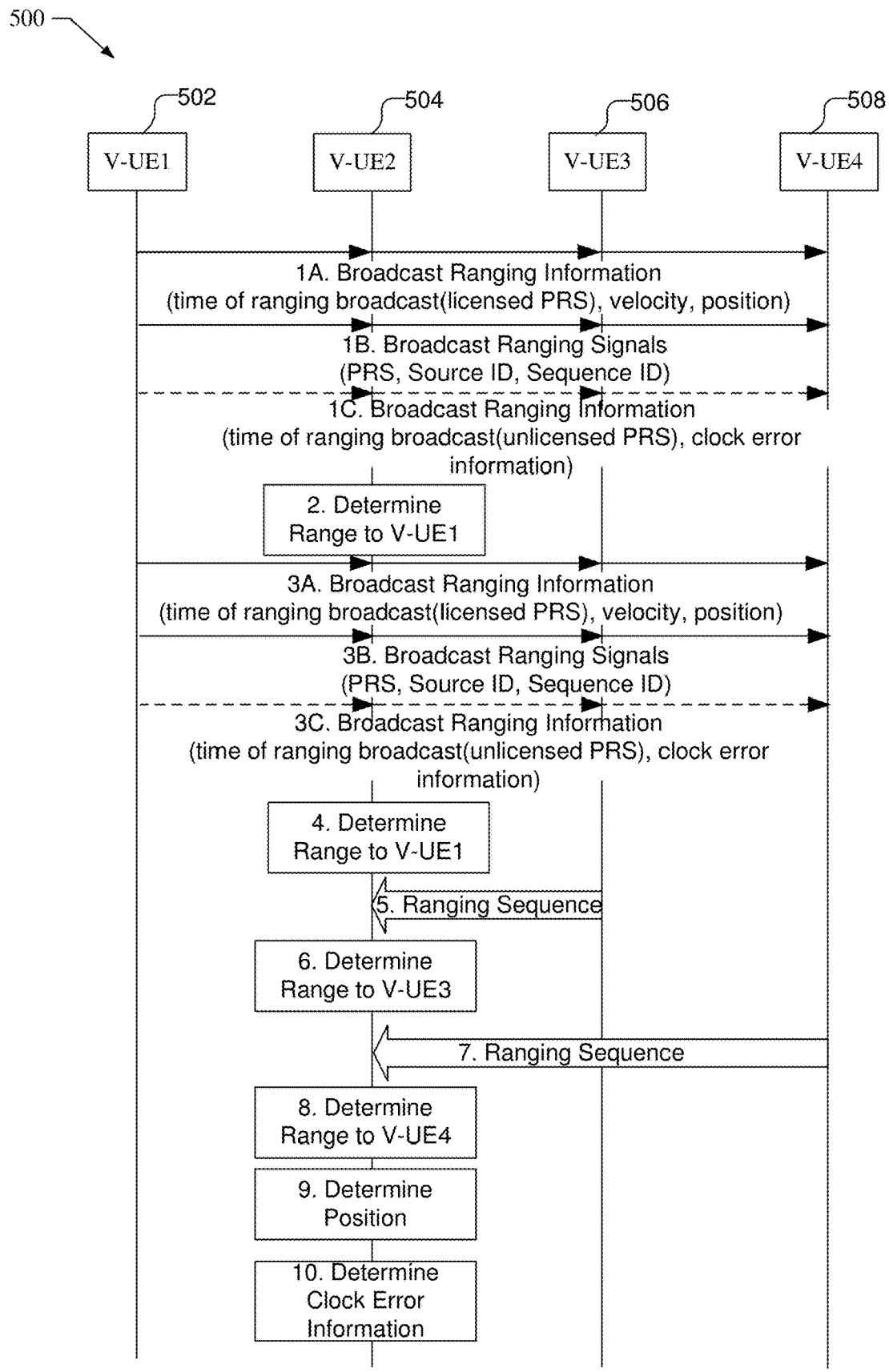
FIG. 5 illustrates signaling flow for a multi-phased ranging procedure.

FIG. 5 illustrates an example of a signaling flow 500 for a multi-phased ranging procedure that includes multiple entities, including V-UE1 502, V-UE2 504, V-UE3 506, and V-UE4 508. The V-UE entities, for example, may be similar to V-UE 102, 104 shown in FIG. 1 or entities 410 and 450 in FIG. 4. In some implementations, one or more of the V-UEs may be a pedestrian UE or a RSU, such as RSU 110, shown in FIG. 1. It should be understood that FIG. 5 illustrates the signaling for the multi-phased ranging procedure, and that additional or other communications may be transmitted between one or more of the V-UEs shown in FIG. 5 in sidelink signaling or through one or more infrastructure devices, such as RSU 110 or base stations 122, 124 shown in FIG. 1. Additionally, FIG. 5 illustrates the multi-phased signaling from each V-UE at separate distinct times, e.g., stages 1A-1C from V-UE1 502 and stage 5 from V-UE3. It should be understood, however, that the multi-phased signaling from the various V-UEs may interleave.

As illustrated, in a first sequence, including stages 1A, 1B, and 1C, the V-UE1 502 broadcasts multi-phase signaling for ranging. At stage 1A, the transmitting V-UE1 502 broadcasts a first message that includes one or more of ranging information, a source ID identifying the V-UE1 502, location information for the V-UE1 502, and the expected time of the broadcast of the ranging signal, e.g., if the PRS broadcast is on a licensed spectrum, or a combination thereof. The location information may include, for example, a current location and velocity of the V-UE1 502 (e.g., determined from a magnetometer, and wheel sensor or other sensor capable of determining velocity) or the expected location of the V-UE1 502 at the expected time of broadcast of the ranging signal, which may be determined based on the current location and velocity of the V-UE1 501 and the amount of time until the broadcast of the ranging signal (if the PRS broadcast is on a licensed spectrum. The first message may be a broadcast on an unlicensed or licensed spectrum, such as the ITS spectrum. The broadcast first message may be received by any nearby entity, such as V-UE2 504, V-UE3 506, and V-UE4 508.

At stage 1B, the transmitting V-UE1 502 broadcasts the ranging signal, which may be a PRS signal. The ranging signal may include the source ID and may further include a sequence ID, e.g., identifying the sequence of multi-phase signaling from the V-UE1 502 (the source ID and sequence ID may be the same). For example, the PRS waveforms may be selected from a set of pre-defined PRS waveforms that are each associated with an ID. The V-UE1 502 may select the PRS waveform based on its source ID and/or sequence ID (e.g., provided in the message at stage 1A). Upon receipt of the broadcast ranging signal, the receiving V-UE's may deduce the source ID and sequence ID for the V-UE1 502 based on the PRS waveform and associated ID as provided in the set of pre-defined PRS waveforms. The ranging signal may be a broadcast on an unlicensed or licensed spectrum. The broadcast ranging signal may be received by any nearby entity, such as V-UE2 504, V-UE3 506, and V-UE4 508, which determines the time of arrival of the ranging signal.

At stage 1C, the transmitting V-UE1 502 broadcasts additional ranging information in a second message, including one or more of clock error information, the time of the broadcast of the ranging signal (at stage 1B), e.g., if the PRS broadcast was on an unlicensed spectrum, or a combination thereof. The time of the broadcast of the ranging signal as provided in stage 1C is provided if the PRS broadcast is on an unlicensed spectrum, while the expected time of broadcast of the ranging signal as provided in stage 1A is provided if the PRS broadcast is on a licensed spectrum. The clock error information of the transmitting V-UE1 502, for example, may be one or more of clock drift, clock bias, the variance in clock drift, and variance in the clock bias, or a combination thereof. The clock error information is obtained by V-UE1 502 indirectly by the multi-phased ranging procedure from nearby entities, e.g., V-UE3 506 at stage 5 and V-UE4 508 at stage 7. The second message may further include the source ID and sequence ID. The second message may be a broadcast on an unlicensed or licensed spectrum, such as the ITS spectrum. The broadcast second message may be received by any nearby entity, such as V-UE2 504, V-UE3 506, and V-UE4 508. In some implementations, the first message and the second message may be combined into a single message that may be broadcast, e.g., at stage 1A or at stage 1C.

At stage 2, a V-UE2 504 may use the broadcast first sequence of signaling received at stages 1A, 1B, and 1C, to determine the range between the V-UE2 504 and the transmitting V-UE1 502. The receiving V-UE2 504 may associate the first and second messages and the ranging signal received at stages 1A, 1B, and 1C, e.g., based on the source ID and/or sequence ID included in each message and, e.g. embedded in the PRS waveform. For example, V-UE2 504 may determine the source ID and sequence ID for the V-UE1 502 based on the ID associated with the PRS waveform as provided in the set of pre-defined PRS waveforms. The range between the V-UE2 504 and the transmitting V-UE1 502 may be determined, for example, using the expected time of broadcast of the licensed ranging signal from the first message received at stage 1A or the time of broadcast of the unlicensed ranging signal received at stage 1C provides and the time of arrival of the ranging signal as measured by V-UE2 504. The difference between the time of broadcast and time of arrival is the travel time for the ranging signal. The range (distance) between the receiving V-UE2 504 and the transmitting V-UE1 502 is the time of travel of the ranging signal divided by the speed of the ranging signal, i.e., the speed of light. The receiving V-UE2 504 may adjust the determined range, e.g. by adjusting the time of broadcast (or the time of arrival), based on the clock error information received at stage 1C, to improve the accuracy of the determined range information. The receiving V-UE2 504 may additionally or alternatively adjust the determined range, e.g. by adjusting the time of arrival (or the time of broadcast) based on the receiving V-UE2 504 own clock error as determined by the receiving V-UE2 504 to improve the accuracy of the determined range information.

The receiving V-UE2 504 may further determine a position estimate based on the determined range to the transmitting V-UE1 502 and the position of the transmitting V-UE1 502 at the time of broadcast of the ranging signal. A position estimate, for example, may be at least partially based on knowledge of the location of the road and local geography, for example, eliminating positions that are not probably or possible for the receiving V-UE2 504. The position of the transmitting V-UE1 502, for, may be based on the expected location of the V-UE1 502, if received at stage 1A. If the expected location of the V-UE1 502 was not provided, the position of the transmitting V-UE1 502 at the time of broadcast of the ranging signal may be determined by the receiving V-UE2 504 based on the current location of the V-UE1 502 and the current velocity of the V-UE1 502 provided at stage 1A and the time between receiving the message at stage 1A and receiving the ranging signal at stage 1B. For example, the distance and direction of travel of the transmitting V-UE1 502 may be determined based on the current velocity (assuming the velocity does not change significantly) and the amount of time between transmission of the first message at stage 1A and the ranging signal at stage 1B. The current location of the transmitting V-UE1 502 at the time of broadcasting the first message at stage 1B may be updated by the receiving V-UE2 504 based on the determined distance and direction of travel of the transmitting V-UE1 502.

Additional sequences of multi-phase signaling for ranging may be broadcast by the V-UE1 502, e.g., illustrated as stages 3A, 3B, and 3C, e.g., during a periodic group phase, which may have a periodicity of 100 msec. for instance. At stage 3A, similar to stage 1A, the transmitting V-UE1 502 broadcasts a first message that includes one or more of ranging information including the source ID, location information for the V-UE1 502, and the expected time of the broadcast of the ranging signal, e.g., if the PRS broadcast is on a licensed spectrum, or a combination thereof. The broadcast first message may be received by any nearby entity, such as V-UE2 504, V-UE3 506, and V-UE4 508.

At stage 3B, the transmitting V-UE1 502 broadcasts the ranging signal, which may be a PRS signal and may include the source ID and a sequence ID, e.g., identifying the sequence of multi-phase signaling from the V-UE1 502 and distinguishing the present sequence from, e.g., the previous sequence of stages 1A, 1B, and 1C. The broadcast ranging signal may be received by any nearby entity, such as V-UE2 504, V-UE3 506, and V-UE4 508, which determines the time of arrival of the ranging signal.

At stage 3C, the transmitting V-UE1 502 broadcasts, in a second message, additional ranging information including clock error information, the time of the broadcast of the ranging signal (at stage 1B), e.g., if the PRS broadcast was on an unlicensed spectrum, or a combination thereof. The broadcast second message may be received by any nearby entity, such as V-UE2 504, V-UE3 506, and V-UE4 508.

At stage 4, a V-UE2 504 may use the broadcast second sequence of signaling received at stages 3A, 3B, and 3C, to determine the range between the V-UE2 504 and the transmitting V-UE1 502 and the position of the receiving V-UE2 504, e.g., as discussed at stage 2. The determined range may be adjusted based on the clock error as received from the transmitting V-UE1 502 and/or measured by the receiving V-UE2 504.

At stage 5, the V-UE2 504 receives a sequences of multi-phase signaling for ranging broadcast by the V-UE3 506. The multi-phase signaling sequence at stage 5 may include three separate stages, similar to stages 1A, 1B, and 1C, but specific for transmitting V-UE3 506.

At stage 6, the V-UE2 504 may use the broadcast sequence of signaling received at stage 5 to determine the range between the V-UE2 504 and the transmitting V-UE3 506, similar to the discussion at stages 2 and 4. In some implementations, the V-UE2 504 may also determine an estimated position of the receiving V-UE2 504 based on the ranges and known positions of V-UE1 502 (e.g., determined at stages 2 and 4) and V-UE3 506 (determined at stage 6). Additionally, the position estimate may be at least partially based on knowledge of the location of the road and local geography, for example, eliminating positions that are not probably or possible for the receiving V-UE2 504.

At stage 7, the V-UE2 504 receives a sequences of multi-phase signaling for ranging broadcast by the V-UE4 508. The multi-phase signaling sequence at stage 7 may include three separate stages, similar to stages 1A, 1B, and 1C, but specific for transmitting V-UE4 508.

At stage 8, the V-UE2 504 may use the broadcast sequence of signaling received at stage 7 to determine the range between the V-UE2 504 and the transmitting V-UE4 508, similar to the discussion at stages 2 and 4.

At stage 9, the V-UE2 504 may determine the position of the receiving V-UE2 504, e.g., based on the determined ranges and known positions of V-UE1 502 (e.g., determined at stages 2 and 4), V-UE3 506 (determined at stage 6), and V-UE4 508 (determined at stage 8). The V-UE2 504, for example, may determine a position estimate using trilateration. In some implementations, the V-UE2 504 may further use inertial sensor measurements and a previously known position, e.g., in a dead reckoning process, to assist in determining the present position. Additionally, the position estimate may be at least partially based on knowledge of the location of the road and local geography, for example, eliminating positions that are not probably or possible for the receiving V-UE2 504.

At stage 10, the V-UE2 504 may determine clock error information, e.g., based on ranging sequences received from other V-UEs, and the position of the V-UE2 504, e.g., determined at stage 9. For example, the V-UE2 504 may compare its determined position, e.g., as determined at stage 9 and/or determined using other means, such as dead-reckoning or a satellite positioning system (SPS) such as GPS, to estimated positions based on received ranging signals. The clock error may be determined based on the difference in estimated positions as discussed further in FIG. 7, and a variance in clock error may be determined the change in clock error over repeated measurements. The V-UE2 504 may include the clock error information in the second message of its own multi-phased ranging sequences (not shown in FIG. 5).

Figure 6:
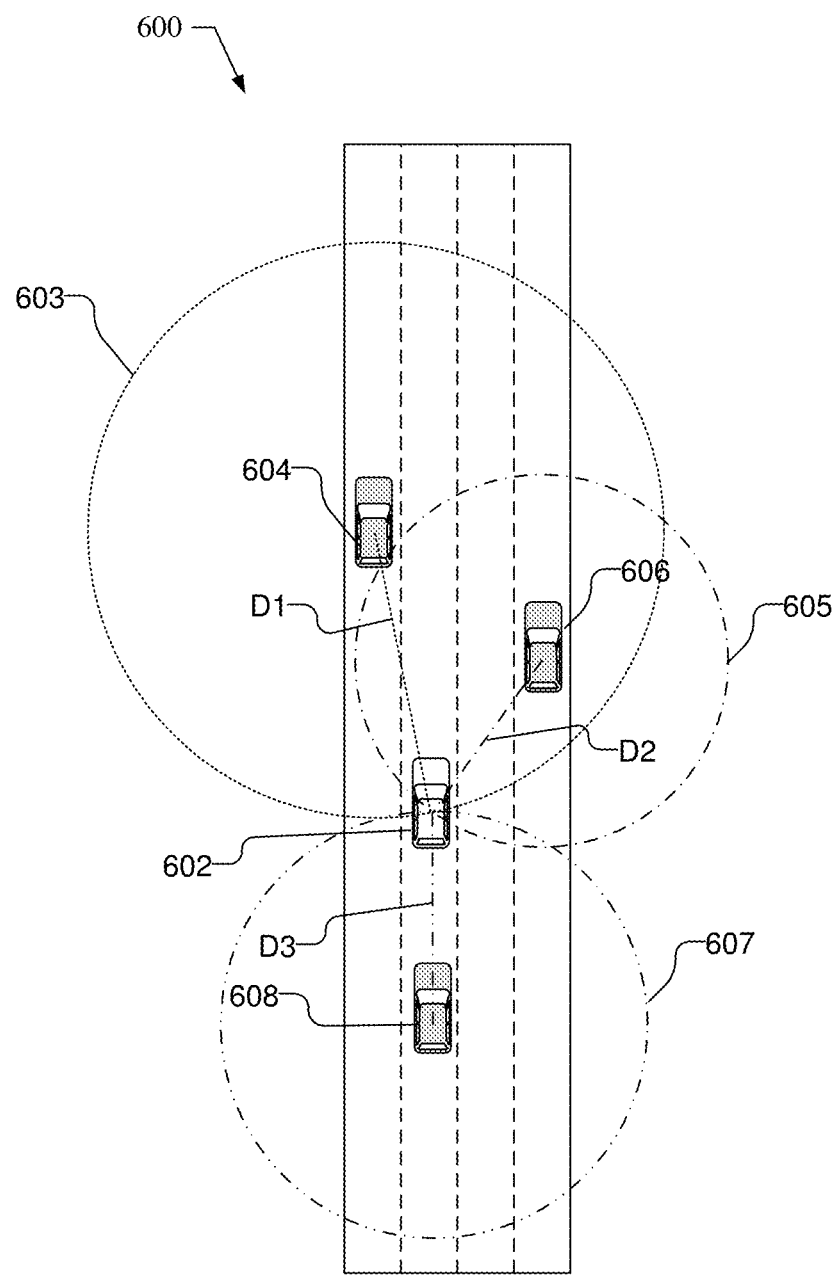
FIG. 6 illustrates an environment in which a V-UE determines its range and position based on ranging signals from multiple other V-UEs.

FIG. 6 illustrates an environment 600 in which a V-UE 602 determines its range to multiple other V-UEs 604, 606, and 608 and its position, e.g., using procedure shown in FIG. 5. As illustrated, for example, the V-UE 602 may determines its range D1 to V-UE 604, which defines a circle 603 around V-UE 604 having radius D1. The position of the transmitting V-UE 604 at the time of broadcasting the ranging signal is known based on the location information included in the first message of the multi-phase ranging sequence, e.g., at stage 1A or stage 3A of FIG. 5. Thus, the position of the receiving V-UE 602 may be anywhere on the circle 603. With knowledge of the road and local geography, positions that are not probably or possible for the V-UE 602 may be eliminated, such as any positions off of the road.

Similarly, the V-UE 602 may determines its range D2 to V-UE 606 using multi-phase ranging sequence as discussed in FIG. 5, which defines a circle 605 around V-UE 606 having radius D2. The position of the transmitting V-UE 606 at the time of broadcasting the ranging signal is known based on the location information that V-UE 606 included in the first message of the multi-phase ranging sequence. Thus, the position of the receiving V-UE 602 may be where circle 605 intersects circle 603. With knowledge of the road and local geography, positions that are not probably or possible for the V-UE 602 may be eliminated, such as the intersection of circle 603 and 605 that occurs off the road.

Similarly, the V-UE 602 may determines its range D3 to V-UE 608 using multi-phase ranging sequence as discussed in FIG. 5, which defines a circle 607 around V-UE 608 having radius D3. The position of the transmitting V-UE 608 at the time of broadcasting the ranging signal is known based on the location information that V-UE 608 included in the first message of the multi-phase ranging sequence. Thus, the position of the receiving V-UE 602 may be determined as the intersection of circles 603, 605, and 607, e.g., using trilateration.

Figure 7:
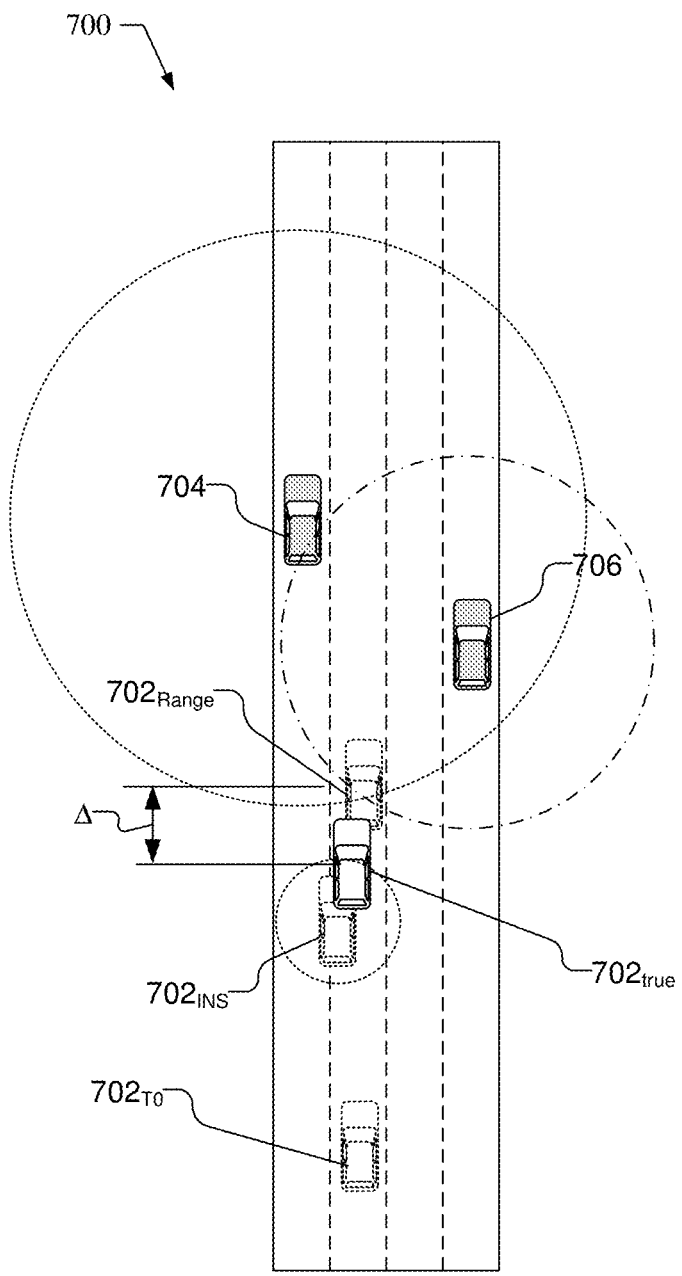
FIG. 7 illustrates an environment in which a V-UE determines its clock error based on ranging signals from multiple other V-UEs.

FIG. 7 illustrates an environment 700 including V-UE 702, V-UE 704, and V-UE 706, and illustrates the determination of clock error by the V-UE 702, which V-UE 702 may include in, e.g., the second message (e.g., at stage 1C or 3C of FIG. 5) when V-UE 702 transmits a multi-phase ranging sequence. FIG. 7, for example, illustrates the positions of V-UE 704 and V-UE 706 at a current time T1. FIG. 7 illustrates the position of V-UE 702 at a previous time T0 (designated 702$_{T0}$). The position of V-UE 702$_{T0}$ at the previous time T0, for example, may have been determined using a multi-phase ranging sequence as discussed in FIGS. 5 and 6.

Based on the previous position of V-UE 702$_{T0}$, the current position of the V-UE 702 may be estimated using inertial sensors, such as accelerometers, gyroscopes, magnetometers, and the velocity sensor in the vehicle (such as a wheel sensor), e.g., in a dead reckoning procedure, illustrated as inertial position 702$_{INS}$, which has an uncertainty, as illustrated by the dotted circle around position 702$_{INS}$. The current position of the V-UE 702 may also be estimated based on determined ranges to the first vehicle V-UE 704 and second vehicle V-UE 706, illustrated as dashed circles around each of V-UE 704 and V-UE 706, which produces a ranging position 702$_{Range}$. In some implementations, a range to a third vehicle may be used to determine the ranging position 702$_{Range}$. The ranges to V-UE 704 and 706 include clock errors. If desired, additional estimated positions of the V-UE 702 may be determined, e.g., using a GPS sensor. Using the various estimated positions, e.g., 702$_{INS}$ and 702$_{Range}$, a final estimated position of the V-UE 702$_{true}$ may be determined. For example, the confidence level of each sensor output that produces the respective positions is captured as the standard deviation of each position. The positions may be combined based on the multiple standard deviations. For example, if one sensor has a high standard deviation, it indicates that the output based on that measurement is noisy and may be given less weight.

The difference 4 between the final estimated position of the V-UE 702$_{true}$ and the estimated position based on ranging, e.g., position 702$_{Range}$ may be used to determine the clock error for the V-UE 702, e.g., by dividing the difference in positions by the speed of light. By monitoring the clock error estimation over time, e.g., for two or more time instances, the variance of the clock error estimation for the V-UE 702 may be determined. When the V-UE 702 transmits a multi-phase ranging sequence, the V-UE 702 may provide the clock error information, e.g., in the second message at stage 1C or 3C shown in FIG. 5.

The receiving V-UE may determine the range to the transmitting V-UE as the difference between the time of broadcast of the PRS signal (as indicated by the transmitting V-UE) and the time of arrival of the PRS signal (as measured by the receiving V-UE). The receiving V-UE may correct the range using the clock error estimation provided by the transmitting V-UE in the second message, e.g., at stage 1C of FIG. 5. For example, the receiving V-UE may alter (increase or decrease, as appropriate) by the clock error estimation provided by the transmitting V-UE.

Figure 8:
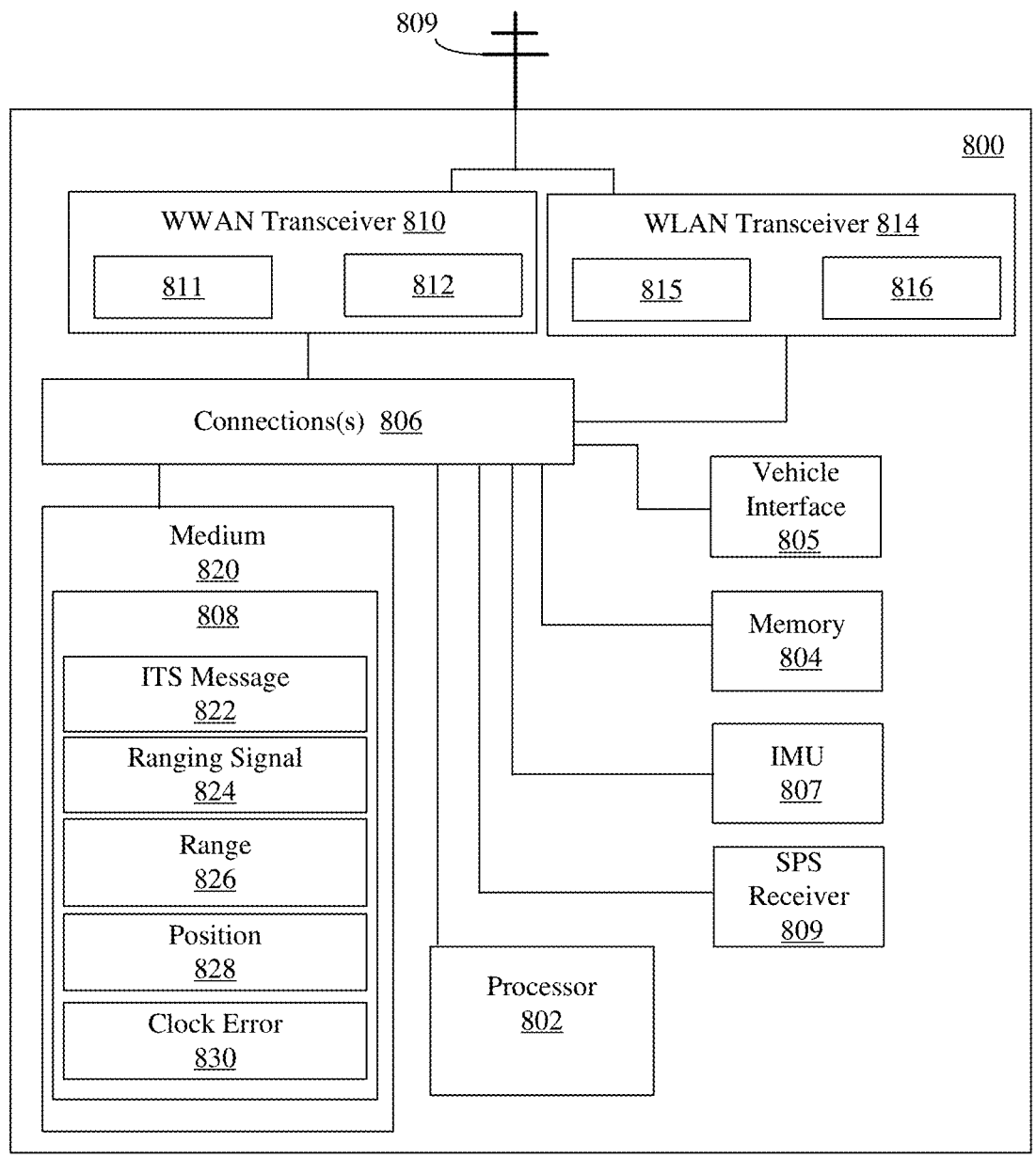
FIG. 8 shows a schematic block diagram illustrating certain exemplary features of a V-UE configured for a multi-phased ranging procedure.

FIG. 8 shows a schematic block diagram illustrating certain exemplary features of a vehicle user equipment (V-UE) 800, which may be UE in a vehicle, such as described in reference to FIGS. 1-7. The V-UE 800 may be configured to control the automated driving of a vehicle 102, including using a multi-phase ranging sequence for ranging and positioning, as discussed herein. The V-UE 800 may include a vehicle interface 805 with which commands are provided to the vehicle for automated driving and sensory input, including speed and acceleration, may be provided from the vehicle to V-UE 800. The V-UE 800 may, for example, include one or more processors 802, memory 804, an inertial measurement unit (IMU) 807 that may include, e.g., an accelerometer, gyroscope, magnetometers, etc., which may be used to detect the motion or one or more motion characteristics of the vehicle, a satellite positioning system (SPS) receiver 809 to determine, e.g., a GPS position, and an external interface including, e.g., a Wireless Wide Area Network (WWAN) transceiver 810, and a Wireless Local Area Network (WLAN) transceiver 814, which may be operatively coupled with one or more connections 806 (e.g., buses, lines, fibers, links, etc.) to non-transitory computer readable medium 820 and memory 804. The V-UE 800 may further include additional items, which are not shown, such as a user interface that may include e.g., a display, a keypad or other input device, such as virtual keypad on the display, through which a user may interface with the user device. In certain example implementations, all or part of V-UE 800 may take the form of a chipset, and/or the like. Transceiver 810 may be, e.g., a cellular transceiver, that is configured to transmit and receive inter-vehicle communications in the wireless network, as illustrated in FIG. 1. The transceiver 810 may include a transmitter 811 enabled to transmit one or more signals over one or more types of wireless communication networks and a receiver 812 to receive one or more signals transmitted over the one or more types of wireless communication networks. Transceiver 814 may be, e.g., a short range transceiver, and may be configured to transmit and receive inter-vehicle communications in the wireless network, as illustrated in FIG. 1. The transceiver 814 may include a transmitter 815 enabled to transmit one or more signals, including PRS and ITS messages, over one or more types of wireless communication networks and a receiver 816 to receive one or more signals, e.g., including PRS and ITS messages, transmitted over the one or more types of wireless communication networks. The transceivers 810 and 814 enable the V-UE 800 to communicate with transportation entities using D2D communication links, such as DSRC, C-V2X, or 5G NR.

In some embodiments, V-UE 800 may include antenna 809, which may be internal or external. The antenna 809 may be used to transmit and/or receive signals processed by transceiver 810 and/or transceiver 814. In some embodiments, antenna 809 may be coupled to transceiver 810 and/or transceiver 814. In some embodiments, measurements of signals received (transmitted) by V-UE 800 may be performed at the point of connection of the antenna 809 and transceiver 810 and/or transceiver 814. For example, the measurement point of reference for received (transmitted) RF signal measurements may be an input (output) terminal of the receivers 812, 816 (transmitters 811, 815) and an output (input) terminal of the antenna 809. In a V-UE 800 with multiple antennas 809 or antenna arrays, the antenna connector may be viewed as a virtual point representing the aggregate output (input) of multiple antennas.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of V-UE 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in V-UE 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in V-UE 800 is merely exemplary, and as such the functionality of the modules and/or data structures may be combined, separated, and/or be structured in different ways depending upon the implementation of the V-UE 800.

The medium 820 and/or memory 804 may include an ITS message module 822 that when implemented by the one or more processors 802 configures the one or more processors 802 to generate and broadcast and to receive ITS messages via the transceiver 814. The generated or received ITS messages, for example, may include a source identifier identifying the V-UE, location information for the V-UE, and an time of broadcast of the ranging signal. The location information, for example, may be a current location, e.g., determined using a multi-phase ranging sequence for ranging and positioning, and a current velocity, e.g., determined based on the IMU 807 and/or vehicle interface 805, or the expected location at the expected time of broadcast of a ranging signal, e.g., determined based on the current location and velocity and the time until broadcast of the ranging signal. The generated or received ITS messages may include clock error information, such as the clock drift, clock bias, variance in the clock drift and clock bias, and the time of broadcast of the ranging signal. The information related to the ranging signal may additionally be configured to include a sequence identifier identifying a ranging signal sequence that includes the first message, a ranging signal, and a second message.

The medium 820 and/or memory 804 may include a ranging signal module 824 that when implemented by the one or more processors 802 configures the one or more processors 802 to broadcast or receive, via the via the transceiver 814, a ranging signal. The ranging signal, for example, may be a PRS signal as discussed herein. The ranging signal may be configured to include the source identifier. In some implementations, the ranging signal may be further configured to include the sequence identifier. The one or more processors 802, for example, may be configured to measure the time of arrival of a received ranging signal.

The medium 820 and/or memory 804 may include a range module 826 that when implemented by the one or more processors 802 configures the one or more processors 802 to determine a range to a broadcasting transmitter, e.g., based on the time of arrival of a received ranging signal and the expected time of transmission of the ranging signal, e.g., as broadcast in a preceding ITS message, which may be associated with the ranging signal using the source ID and sequence ID (if present). The one or more processors 802 may be configured to correct the expected time of transmission (or time of arrival) based on the clock error information received in an ITS message, which may be associated with the ranging signal using the source ID and sequence ID (if present). The one or more processors 802, for example, may be configured to divide the difference between the time of arrival and the expected time of transmission by the speed of the signal (i.e., the speed of light), to determine the range to the broadcasting V-UE.

The medium 820 and/or memory 804 may include a position module 828 that when implemented by the one or more processors 802 configures the one or more processors 802 to determine a position of the V-UE 800, e.g., based on one or more ranges to broadcasting V-UEs and their location information using trilateration or other appropriate techniques discussed herein. For example, the expected location may be broadcast by in the ITS message, or a current location and current velocity may be broadcast in the ITS message, from which the location at the time of broadcast of the ranging signal may be determined, e.g. based on the time between receipt of the ITS message and the ranging signal. The at least one processor 802 may be configured to use sensor measurements from IMU 807 to assist in position determination.

The medium 820 and/or memory 804 may include a clock error module 830 that when implemented by the one or more processors 802 configures the one or more processors 802 to determine clock error information for the V-UE 800, e.g., based on estimated positions determined using received ranging signal and a position estimate based on sensor measurements from IMU 807, e.g. based on dead reckoning, as discussed herein.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program 808. For example, the non-transitory computer readable medium including program code 808 stored thereon may include program code 808 to support transmission and reception of multi-phase ranging sequence for determining a range and position in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable code 808 stored thereon, which if executed by one or more processors 802 may be operatively enabled to perform all or portions of the example operations as described herein. Computer readable medium 820 may be a part of memory 804.

Figure 9:
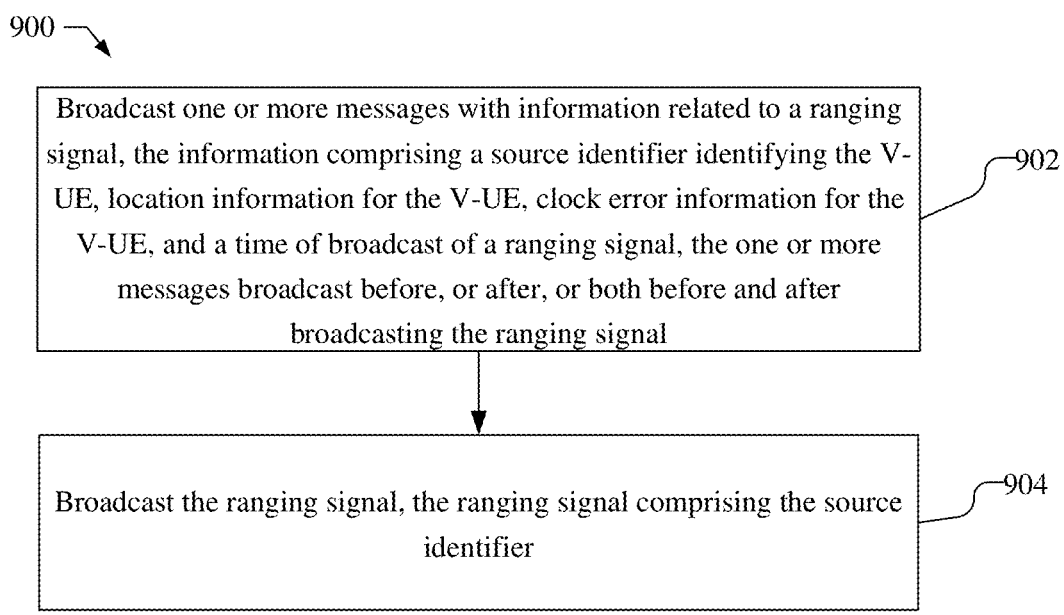
FIG. 9 is a flow chart illustrating a method of ranging between vehicles performed by a V-UE.

FIG. 9 is a flow chart 900 illustrating ranging between vehicles performed by a vehicle based user equipment (V-UE), such as V-UE 102. At block 902, one or more messages are broadcast with information related to a ranging signal, the information comprising a source identifier identifying the V-UE, location information for the V-UE, clock error information for the V-UE, and a time of broadcast of a ranging signal, the one or more messages broadcast before, or after, or both before and after broadcasting the ranging signal, such as discussed at stages 1A, 1C, 3A or 3C of FIG. 5. In some implementations, the one or more messages with the information related to the ranging signal may be broadcast in an Intelligent Transport System (ITS) spectrum. In one example, the location information may include, for example, a location of the V-UE and a velocity of the V-UE when broadcasting the one or more messages. In another example, the location information may be an expected location of the V-UE at the time of broadcast of the ranging signal. In some implementations, the information related to the ranging signal may additionally include a sequence identifier identifying with respect to other ranging signal sequences a ranging signal sequence that includes the one or more messages and the ranging signal. The one or more messages, for example, may be broadcast on a licensed or unlicensed spectrum. In some implementations, the clock error information for the V-UE may be the clock drift and clock bias, while in other implementations, the clock drift information may be a variance in the clock drift and clock bias. In some implementations, the second message may include the source identifier. In some implementations, the second message may further include the sequence identifier. The second message, for example, may be broadcast on a licensed spectrum. A means for broadcasting one or more messages with information related to a ranging signal, the information comprising a source identifier identifying the V-UE, location information for the V-UE, clock error information for the V-UE, and a time of broadcast of a ranging signal, the one or more messages broadcast before, or after, or both before and after broadcasting the ranging signal may be, e.g., the transceiver 814 and the one or more processors 802 with dedicated hardware or implementing executable code or software instructions in memory 804 and/or medium 820, such as the ITS message module 822.

At block 904, the ranging signal is broadcast, the ranging signal comprising the source identifier, e.g., as discussed at stages 1B and 3B of FIG. 5. In some implementations, the ranging signal may be further include the sequence identifier. In some implementations, a waveform of the ranging signal is associated with the source identifier. The ranging signal, for example, may be broadcast on a licensed or unlicensed spectrum. A means for broadcasting the ranging signal, the ranging signal comprising the source identifier may be, e.g., the transceiver 814 and the one or more processors 802 with dedicated hardware or implementing executable code or software instructions in memory 804 and/or medium 820, such as the ranging signal module 824.

In some implementations, the one or more messages may be a first message broadcast before broadcasting the ranging signal, the first message comprising the source identifier identifying the V-UE and the location information for the V-UE, and a second message broadcast after broadcasting the ranging signal, the second message comprising the clock error information for the V-UE, wherein the time of broadcast of the ranging signal is provided in one of the first message before the ranging signal is broadcast and the second message after the ranging signal is broadcast In some implementations, the method may further include receiving ranging signals from at least one other V-UE, e.g., as discussed at stages 1A, 1B, 1C, 3A, 3B, 3C, 5, and 7 in FIG. 5. The clock error information may be determined for the V-UE based on the ranging signals from the at least one other V-UE, e.g., as discussed at stage 10 of FIG. 5. In some implementation, the V-UE may determine the clock error information based on a difference between determine one or more estimated positions based on ranging signals and an estimated position based on inertial sensors. A means for receiving ranging signals from at least one other V-UE may be, e.g., the transceiver 814 and the one or more processors 802 with dedicated hardware or implementing executable code or software instructions in memory 804 and/or medium 820, such as the ITS message module 822, and ranging signal module 824. A means for determining the clock error information for the V-UE based on the ranging signals from the at least one other V-UE may be, e.g., the transceiver 814 and the one or more processors 802 with dedicated hardware or implementing executable code or software instructions in memory 804 and/or medium 820, such as the range module 826, position module 828, and the clock error module 830.

In some implementations, the first message, the ranging signal, and the second message may be a first ranging signal sequence, and the method may include broadcasting multiple ranging signal sequences at different time instances, e.g., as discussed at stages 3A, 3B, and 3C of FIG. 5. A means for broadcasting multiple ranging signal sequences at different time instances may be, e.g., the transceiver 814 and the one or more processors 802 with dedicated hardware or implementing executable code or software instructions in memory 804 and/or medium 820, such as the ITS message module 822 and the ranging signal module 824.

Figure 10:
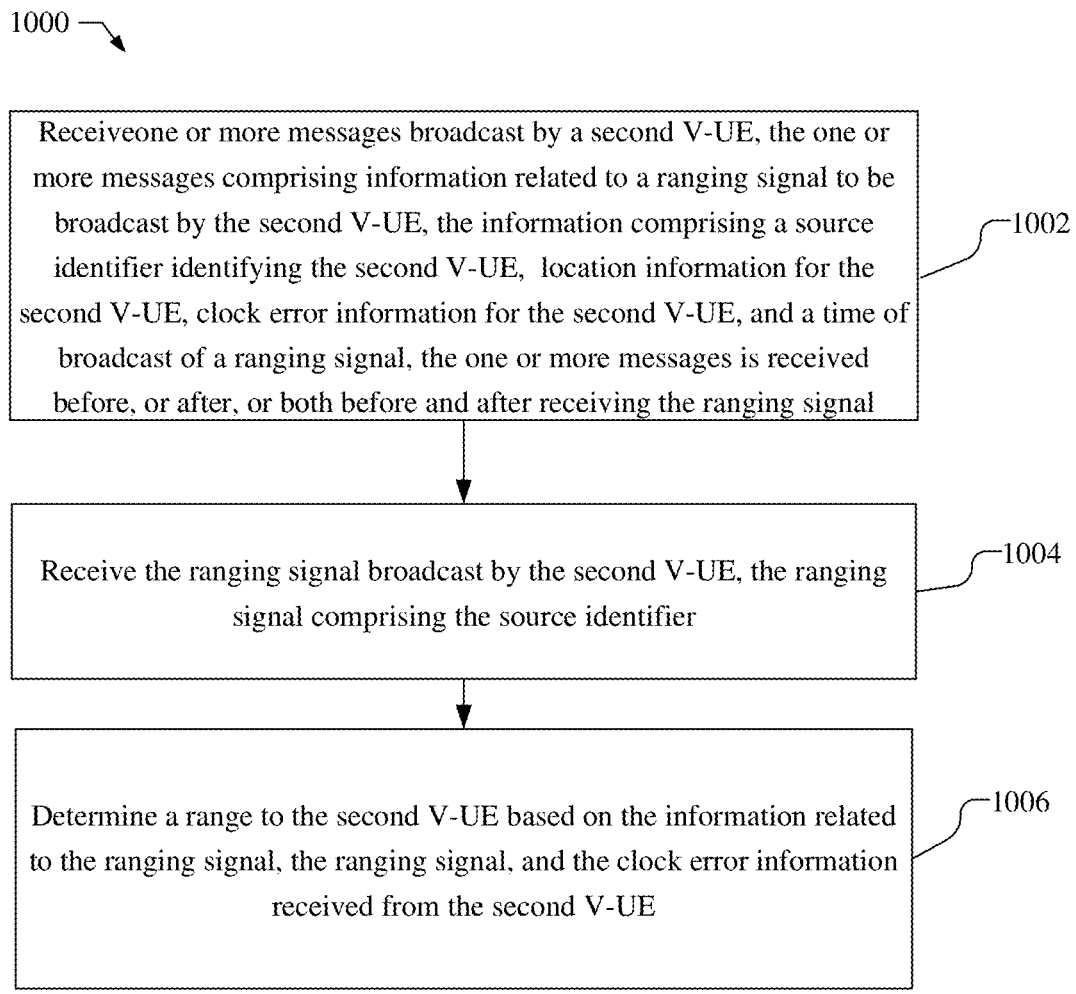
FIG. 10 is a flow chart illustrating another method of ranging between vehicles performed by a V-UE.

FIG. 10 is a flow chart 1000 illustrating ranging between vehicles performed by a first vehicle based user equipment (V-UE), such as V-UE 102. At block 1002, one or more messages broadcast by a second V-UE are received, the one or more messages comprising information related to a ranging signal to be broadcast by the second V-UE, the information comprising a source identifier identifying the second V-UE, location information for the second V-UE, clock error information for the second V-UE, and a time of broadcast of a ranging signal, the one or more messages is received before, or after, or both before and after receiving the ranging signal, such as discussed at stages 1A, 1C, 3A, or 3C of FIG. 5. In some implementations, the one or more messages with the information related to the ranging signal may be received in an Intelligent Transport System (ITS) spectrum. In one example, the location information may include, for example, a location of the V-UE and a velocity of the V-UE when broadcasting the one or more messages. In another example, the location information may be an expected location of the V-UE at the time of broadcast of the ranging signal. In some implementations, the information related to the ranging signal may additionally include a sequence identifier identifying with respect to other ranging signal sequences a ranging signal sequence that includes the one or more messages and the ranging signal. The one or more messages, for example, may be received on a licensed spectrum or unlicensed spectrum. In some implementations, the second message may be received in an Intelligent Transport System (ITS) spectrum. In some implementations, the clock error information for the V-UE may be the clock drift and clock bias, while in other implementations, the clock drift information may be a variance in the clock drift and clock bias. In some implementations, the second message may include the source identifier. In some implementations, the second message may further include the sequence identifier. The second message, for example, may be received on a licensed spectrum. A means for receiving one or more messages broadcast by a second V-UE, the one or more messages comprising information related to a ranging signal to be broadcast by the second V-UE, the information comprising a source identifier identifying the second V-UE, location information for the second V-UE, clock error information for the second V-UE, and a time of broadcast of a ranging signal, the one or more messages is received before, or after, or both before and after receiving the ranging signal may be, e.g., the transceiver 814 and the one or more processors 802 with dedicated hardware or implementing executable code or software instructions in memory 804 and/or medium 820, such as the ITS message module 822.

At block 1004, the ranging signal broadcast by the second V-UE may be received, the ranging signal comprising the source identifier, e.g., as discussed at stages 1B and 3B of FIG. 5. In some implementations, the ranging signal may be further include the sequence identifier. The ranging signal, for example, may be received on a licensed or unlicensed spectrum. In one implementation, a waveform of the ranging signal is associated with the source identifier. A means for receiving the ranging signal broadcast by the second V-UE, the ranging signal comprising the source identifier may be, e.g., the transceiver 814 and the one or more processors 802 with dedicated hardware or implementing executable code or software instructions in memory 804 and/or medium 820, such as the ranging signal module 824.

At block 1006, a range to the second V-UE is determined based on the information related to the ranging signal, the ranging signal, and the clock error information received from the second V-UE, e.g., as discussed at stages 2 and 4 of FIG. 5. In one implementation, the range may be determined based on a measured time of arrival of the ranging signal and the expected time of transmission of the ranging signal, which may be corrected using the clock error information. In one implementation, the difference between the time of arrival and the expected time of transmission may be divided by the speed of the light to determine the range. A means for determining a range to the second V-UE based on the information related to the ranging signal, the ranging signal, and the clock error information received from the second V-UE may be, e.g., the one or more processors 802 with dedicated hardware or implementing executable code or software instructions in memory 804 and/or medium 820, such as the range module 826.

In some implementations, the one or more messages and the ranging signal may be a first ranging signal sequence, and the method may include receiving multiple ranging signal sequences at different time instances, e.g., as discussed at stages 3A, 3B, and 3C of FIG. 5. A means for receiving multiple ranging signal sequences at different time instances may be, e.g., the transceiver 814 and the one or more processors 802 with dedicated hardware or implementing executable code or software instructions in memory 804 and/or medium 820, such as the ITS message module 822 and the ranging signal module 824.

In some implementations, the one or more messages and the ranging signal may be a first ranging signal sequence. The method may further include receiving a second ranging signal sequences from a third V-UE including at least a location of the third V-UE and a velocity of the third V-UE, and determining a range to the third V-UE, e.g., as discussed at stages 5 and 6 of FIG. 5. A means for receiving a second ranging signal sequences from a third V-UE including at least a location of the third V-UE and a velocity of the third V-UE, and determining a range to the third V-UE may be, e.g., the transceiver 814 and the one or more processors 802 with dedicated hardware or implementing executable code or software instructions in memory 804 and/or medium 820, such as the ITS message module 822 and the ranging signal module 824, and the range module 826. The method may further include receiving a third ranging signal sequences from a fourth V-UE including at least a location of the fourth V-UE and a velocity of the fourth V-UE and determining a range to the fourth V-UE, e.g., as discussed at stages 7 and 8 of FIG. 5. A mean for receiving a third ranging signal sequences from a fourth V-UE including at least a location of the fourth V-UE and a velocity of the fourth V-UE and determining a range to the fourth V-UE may be, e.g., the transceiver 814 and the one or more processors 802 with dedicated hardware or implementing executable code or software instructions in memory 804 and/or medium 820, such as the ITS message module 822 and the ranging signal module 824, and the range module 826. The method may further include determining a location of the first V-UE based on the range to the second V-UE, the range to the third V-UE, and the range to the fourth V-UE, and locations of the second V-UE, the third V-UE, and the fourth V-UE and velocities of the second V-UE, the third V-UE, and the fourth V-UE, e.g., as discussed at stage 9 of FIG. 5. A means for determining a location of the first V-UE based on the range to the second V-UE, the range to the third V-UE, and the range to the fourth V-UE, and locations of the second V-UE, the third V-UE, and the fourth V-UE and velocities of the second V-UE, the third V-UE, and the fourth V-UE may be, e.g., the one or more processors 802 with dedicated hardware or implementing executable code or software instructions in memory 804 and/or medium 820, such as the position module 828.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of ranging between vehicles performed by a vehicle based user equipment (V-UE), the method comprising:
   broadcasting one or more messages with information related to a ranging signal, the information comprising a source identifier identifying the V-UE, location information for the V-UE, clock error information for the V-UE, and a time of broadcast of a ranging signal, the one or more messages broadcast before, or after, or both before and after broadcasting the ranging signal; and
   broadcasting the ranging signal, the ranging signal comprising the source identifier.

2. The method of claim 1, wherein the one or more messages comprises a first message broadcast before broadcasting the ranging signal, the first message comprising the source identifier identifying the V-UE and the location information for the V-UE, and a second message broadcast after broadcasting the ranging signal, the second message comprising the clock error information for the V-UE, wherein the time of broadcast of the ranging signal is provided in one of the first message before the ranging signal is broadcast and the second message after the ranging signal is broadcast.

3. The method of claim 1, wherein the one or more messages with the information related to the ranging signal is broadcast in an Intelligent Transport System (ITS) spectrum and the one or more messages and the ranging signal are broadcast on a licensed spectrum or an unlicensed spectrum.

4. The method of claim 1, wherein the location information comprises at least one of a location of the V-UE, a velocity of the V-UE when broadcasting the one or more messages, and an expected location of the V-UE at the time of broadcast of the ranging signal.

5. The method of claim 1, wherein the information related to the ranging signal further comprises a sequence identifier identifying with respect to other ranging signal sequences a ranging signal sequence comprising the one or more messages and the ranging signal, wherein the ranging signal further comprises the sequence identifier.

6. The method of claim 1, further comprising:
receiving ranging signals from at least one other V-UE; and
determining the clock error information for the V-UE based on the ranging signals from the at least one other V-UE.

7. The method of claim 1, wherein the clock error information for the V-UE comprises a clock drift and clock bias or a variance in the clock drift and clock bias.

8. The method of claim 1, wherein the one or more messages and the ranging signal comprise a first ranging signal sequence, the method further comprising broadcasting multiple ranging signal sequences at different time instances.

9. The method of claim 1, wherein a waveform of the ranging signal is associated with the source identifier.

10. A vehicle based user equipment (V-UE) configured for ranging between vehicles, comprising:
a wireless transceiver configured to receive broadcast signals from other V-UEs;
at least one memory; and
at least one processor coupled to the wireless transceiver and the at least one memory, the at least one processor configured to:
broadcast one or more messages with information related to a ranging signal, the information comprising a source identifier identifying the V-UE, location information for the V-UE, clock error information for the V-UE, and a time of broadcast of a ranging signal, the one or more messages broadcast before, or after, or both before and after broadcasting the ranging signal; and
broadcast the ranging signal, the ranging signal comprising the source identifier.

11. The V-UE of claim 10, wherein the one or more messages comprises a first message broadcast before the ranging signal is broadcast, the first message comprising the source identifier identifying the V-UE and the location information for the V-UE, and a second message broadcast after the ranging signal is broadcast, the second message comprising the clock error information for the V-UE, wherein the time of broadcast of the ranging signal is provided in one of the first message before the ranging signal is broadcast and the second message after the ranging signal is broadcast.

12. The V-UE of claim 10, wherein the one or more messages with the information related to the ranging signal is broadcast in an Intelligent Transport System (ITS) spectrum and the one or more messages and the ranging signal are broadcast on a licensed spectrum or an unlicensed spectrum.

13. The V-UE of claim 10, wherein the location information comprises at least one of a location of the V-UE, a velocity of the V-UE when broadcasting the one or more messages, and an expected location of the V-UE at the time of broadcast of the ranging signal.

14. The V-UE of claim 10, wherein the information related to the ranging signal further comprises a sequence identifier identifying with respect to other ranging signal sequences a ranging signal sequence comprising the one or more messages and the ranging signal, wherein the ranging signal further comprises the sequence identifier.

15. The V-UE of claim 10, wherein the at least one processor is further configured to:
receive ranging signals from at least one other V-UE; and
determine the clock error information for the V-UE based on the ranging signals from the at least one other V-UE.

16. The V-UE of claim 10, wherein the clock error information for the V-UE comprises a clock drift and clock bias or a variance in the clock drift and clock bias.

17. The V-UE of claim 10, wherein the one or more messages and the ranging signal comprise a first ranging signal sequence, wherein the at least one processor is further configured to broadcast multiple ranging signal sequences at different time instances.

18. The V-UE of claim 10, wherein a waveform of the ranging signal is associated with the source identifier.

19. A method of ranging between vehicles performed by a first vehicle based user equipment (V-UE), the method comprising:
receiving one or more messages broadcast by a second V-UE, the one or more messages comprising information related to a ranging signal to be broadcast by the second V-UE, the information comprising a source identifier identifying the second V-UE, location information for the second V-UE, clock error information for the second V-UE, and a time of broadcast of a ranging signal, the one or more messages is received before, or after, or both before and after receiving the ranging signal;
receiving the ranging signal broadcast by the second V-UE, the ranging signal comprising the source identifier; and
determining a range to the second V-UE based on the information related to the ranging signal, the ranging signal, and the clock error information received from the second V-UE.

20. The method of claim 19, wherein the one or more messages comprises a first message received before receiving the ranging signal, the first message comprising the source identifier identifying the second V-UE and the location information for the second V-UE, and a second message received after receiving the ranging signal, the second message comprising the clock error information for the second V-UE, wherein the time of broadcast of the ranging signal is provided in one of the first message before the ranging signal is received and the second message after the ranging signal is received.

21. The method of claim 19, wherein the one or more messages with the information related to the ranging signal is broadcast in an Intelligent Transport System (ITS) spectrum and the one or more messages and the ranging signal are broadcast on a licensed spectrum or an unlicensed spectrum.

22. The method of claim 19, wherein the location information comprises a at least one of location of the second V-UE, a velocity of the V-UE when broadcasting the one or more messages, and an expected location of the V-UE at the time of broadcast of the ranging signal.

23. The method of claim 19, wherein the information related to the ranging signal further comprises a sequence identifier identifying with respect to other ranging signal sequences a ranging signal sequence comprising the one or more messages and the ranging signal, wherein the ranging signal further comprises the sequence identifier.

24. The method of claim 19, wherein the one or more messages and the ranging signal comprise a first ranging signal sequence, the method further comprising receiving multiple ranging signal sequences from the second V-UE at different time instances.

25. The method of claim 19, wherein the one or more messages and the ranging signal comprise a first ranging signal sequence, the method further comprising:
receiving a second ranging signal sequences from a third V-UE including at least a location of the third V-UE and a velocity of the third V-UE, and determining a range to the third V-UE;
receiving a third ranging signal sequences from a fourth V-UE including at least a location of the fourth V-UE and a velocity of the fourth V-UE and determining a range to the fourth V-UE; and
determining a location of the first V-UE based on the range to the second V-UE, the range to the third V-UE, and the range to the fourth V-UE, and locations of the second V-UE, the third V-UE, and the fourth V-UE and velocities of the second V-UE, the third V-UE, and the fourth V-UE.

26. The method of claim 19, wherein a waveform of the ranging signal is associated with the source identifier.

27. A first vehicle based user equipment (V-UE) configured for ranging between vehicles, comprising:
a wireless transceiver configured to receive broadcast signals from other V-UEs;
at least one memory; and
at least one processor coupled to the wireless transceiver and the at least one memory, the at least one processor configured to:
receive one or more messages broadcast by a second V-UE, the one or more messages comprising information related to a ranging signal to be broadcast by the second V-UE, the information comprising a source identifier identifying the second V-UE, location information for the second V-UE, clock error information for the second V-UE, and a time of broadcast of a ranging signal, the one or more messages is received before, or after, or both before and after receiving the ranging signal; and
receive the ranging signal broadcast by the second V-UE, the ranging signal comprising the source identifier; and
determine a range to the second V-UE based on the information related to the ranging signal, the ranging signal, and the clock error information received from the second V-UE.

28. The -UE of claim 27, wherein the one or more messages comprises a first message received before receiving the ranging signal, the first message comprising the source identifier identifying the second V-UE and the location information for the second V-UE, and a second message received after receiving the ranging signal, the second message comprising the clock error information for the second V-UE, wherein the time of broadcast of the ranging signal is provided in one of the first message before the ranging signal is received and the second message after the ranging signal is received.

29. The V-UE of claim 27, wherein the one or more messages with the information related to the ranging signal is broadcast in an Intelligent Transport System (ITS) spectrum and the one or more messages and the ranging signal are broadcast on a licensed spectrum or an unlicensed spectrum.

30. The V-UE of claim 27, wherein the location information comprises at least one of a location of the second V-UE, a velocity of the V-UE when broadcasting the one or more messages, and an expected location of the V-UE at the time of broadcast of the ranging signal.

31. The V-UE of claim 27, wherein the information related to the ranging signal further comprises a sequence identifier identifying with respect to other ranging signal sequences a ranging signal sequence comprising the one or more messages and the ranging signal, wherein the ranging signal further comprises the sequence identifier.

32. The V-UE of claim 27, wherein the one or more messages and the ranging signal comprise a first ranging signal sequence, the method further comprising receiving multiple ranging signal sequences from the second V-UE at different time instances.

33. The V-UE of claim 27, wherein the one or more messages and the ranging signal comprise a first ranging signal sequence, wherein the at least one processor is further configured to:
receive a second ranging signal sequences from a third V-UE including at least a location of the third V-UE and a velocity of the third V-UE, and determining a range to the third V-UE;
receive a third ranging signal sequences from a fourth V-UE including at least a location of the fourth V-UE and a velocity of the fourth V-UE and determining a range to the fourth V-UE; and
determine a location of the first V-UE based on the range to the second V-UE, the range to the third V-UE, and the range to the fourth V-UE, and locations of the second V-UE, the third V-UE, and the fourth V-UE and velocities of the second V-UE, the third V-UE, and the fourth V-UE.

34. The V-UE of claim 27, wherein a waveform of the ranging signal is associated with the source identifier.

* * * * *